United States Patent
von der Embse

(10) Patent No.: US 8,031,791 B2
(45) Date of Patent: Oct. 4, 2011

(54) QLM DECODING

(75) Inventor: Urbain von der Embse, Westchester, CA (US)

(73) Assignee: Urbain A. von der Embse, Westchester, CA (US)

( * ) Notice: Subject to any disclaimer, the term of this patent is extended or adjusted under 35 U.S.C. 154(b) by 457 days.

(21) Appl. No.: 12/151,986

(22) Filed: May 12, 2008

(65) Prior Publication Data
US 2010/0205510 A1    Aug. 12, 2010

Related U.S. Application Data

(63) Continuation-in-part of application No. 09/826,118, filed on Jan. 9, 2001, now Pat. No. 7,376,688, and a continuation-in-part of application No. 10/266,256, filed on Oct. 8, 2002, now Pat. No. 7,391,819, and a continuation-in-part of application No. 10/069,418, filed on Feb. 25, 2002, now abandoned.

(51) Int. Cl.
*H04L 5/12* (2006.01)
(52) U.S. Cl. ........ 375/262; 375/261; 375/260; 375/264; 375/265; 375/341; 714/794; 714/795; 714/792
(58) Field of Classification Search .................. 375/295, 375/260–262, 264, 265, 341; 370/204, 208, 370/210; 714/794, 795, 792
See application file for complete search history.

(56) References Cited

U.S. PATENT DOCUMENTS
6,731,668 B2 * 5/2004 Ketchum .................. 375/130
7,391,819 B1 * 6/2008 von der Embse ......... 375/295

OTHER PUBLICATIONS

U.S. Appl. No. 12/069,418, filed Feb. 11, 2008.*

* cited by examiner

*Primary Examiner* — Phuong Phu

(57) ABSTRACT

A method for implementation of error correction decoding of quadrature layered modulation QLM communications. A bound on communications capacity derived using ideal QLM is approximated with QLM communications links which support data rates independent of the Shannon bound. Trellis symbol and bit demodulation algorithms recover QLM data symbols and bit algorithms offer computational efficiency at a cost of decisioning errors. Correlated bit decisioning error correction decoding and re-encoding can be implemented in a bit demodulation algorithm. Trellis demodulation and trellis decoding algorithms support parallel implementations, and concatenated implementations wherein the error correction decoding is implemented after the QLM demodulation. Concatenated implementation supports turbo decoding, MAP decoding, convolutional decoding, and block decoding by using the decisioning metrics available from QLM demodulation in place of generating the decisioning metrics directly from the detected symbol measurements. The invention describes how QLM can be used with WiFI, WiMaX, CDMA, OWDMA.

6 Claims, 30 Drawing Sheets

QLM Decoding Architectures: Receiver

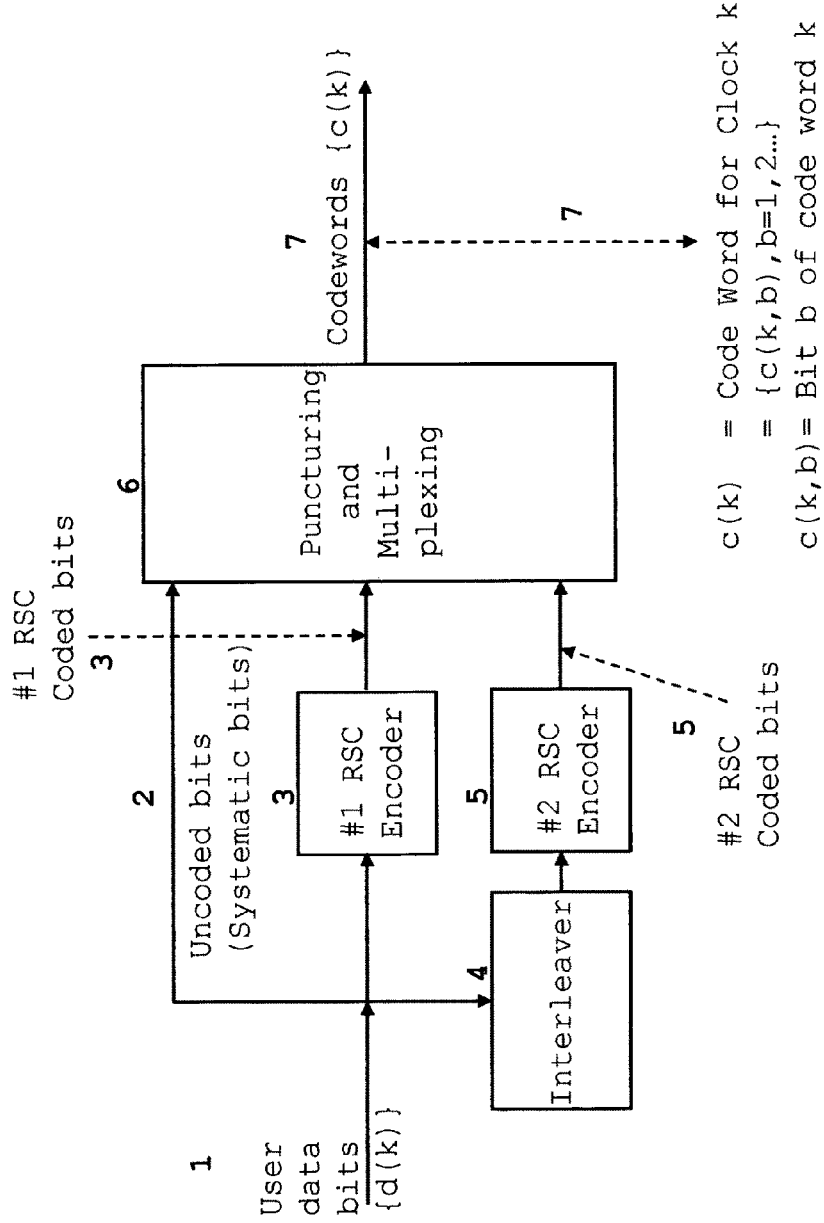
FIG. 1 Prior Art: Turbo Encoder Block Diagram for Parallel Architecture

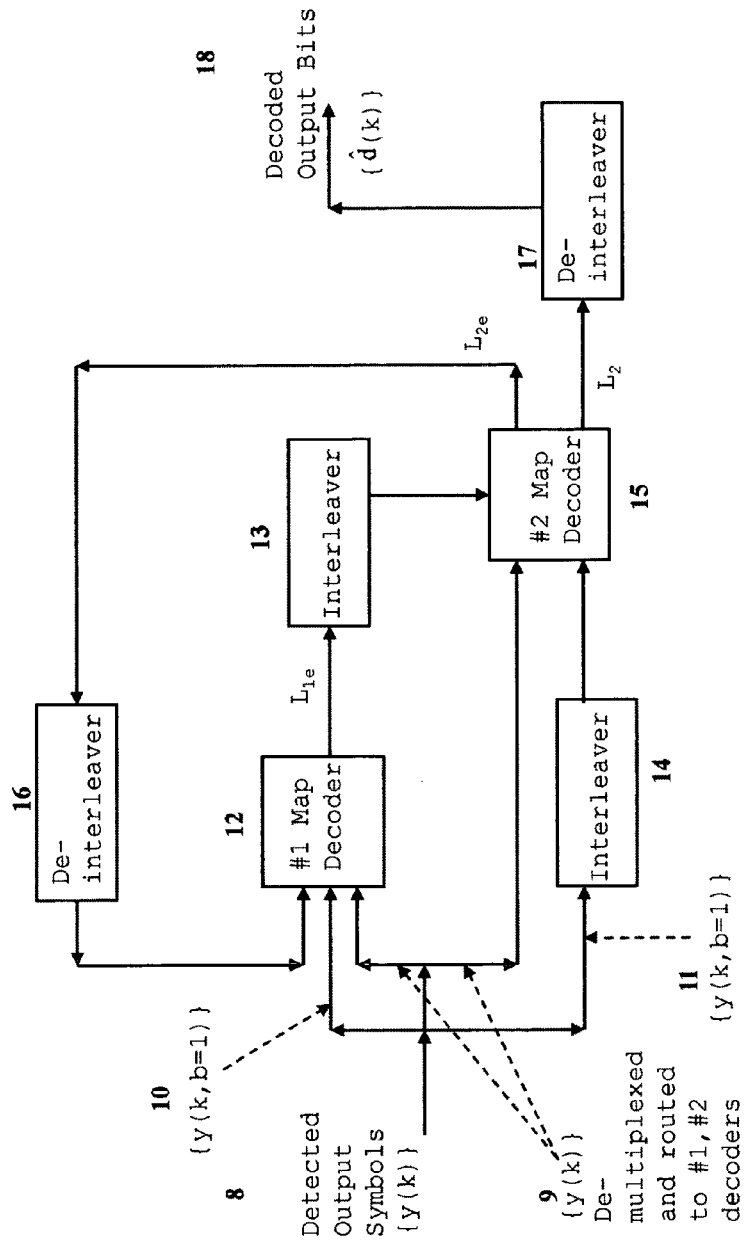
FIG. 2 Prior Art: Iterative Turbo Decode Block Diagram for Parallel Architecture

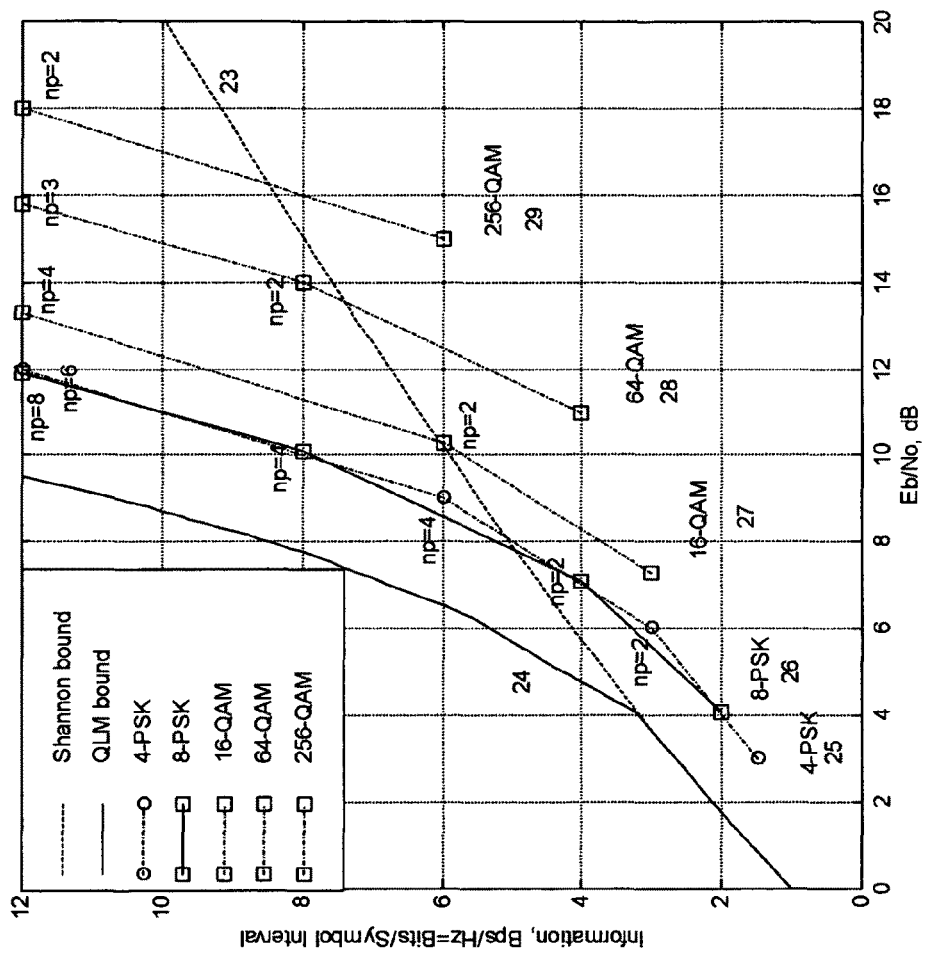
FIG. 3 Information bits/(Symbol interval) Vs. Eb/No for QLM PSK, QLM QAM

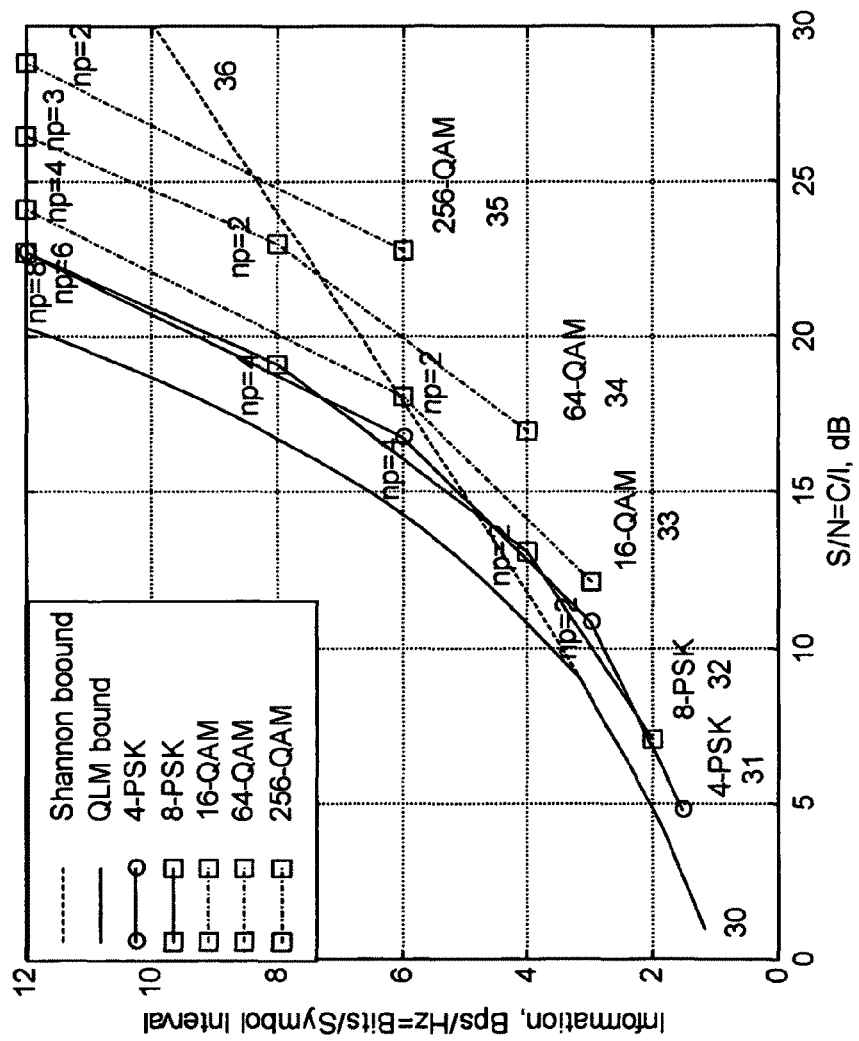
FIG. 4 Information bits/(Symbol interval) Vs. S/N=C/I for QLM PSK, QLM QAM

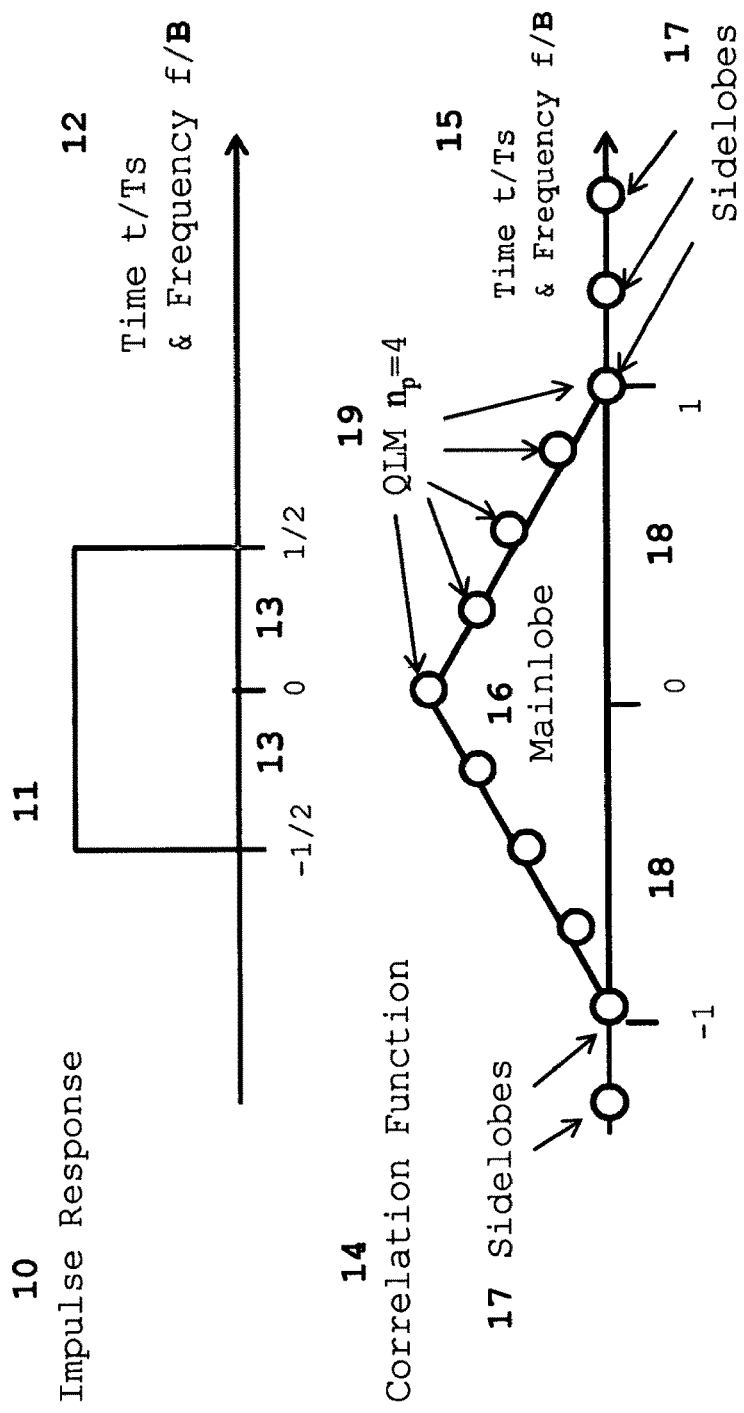
FIG. 5 Correlation in time and frequency for ideal impulse response without/with QLM for $n_p=4$

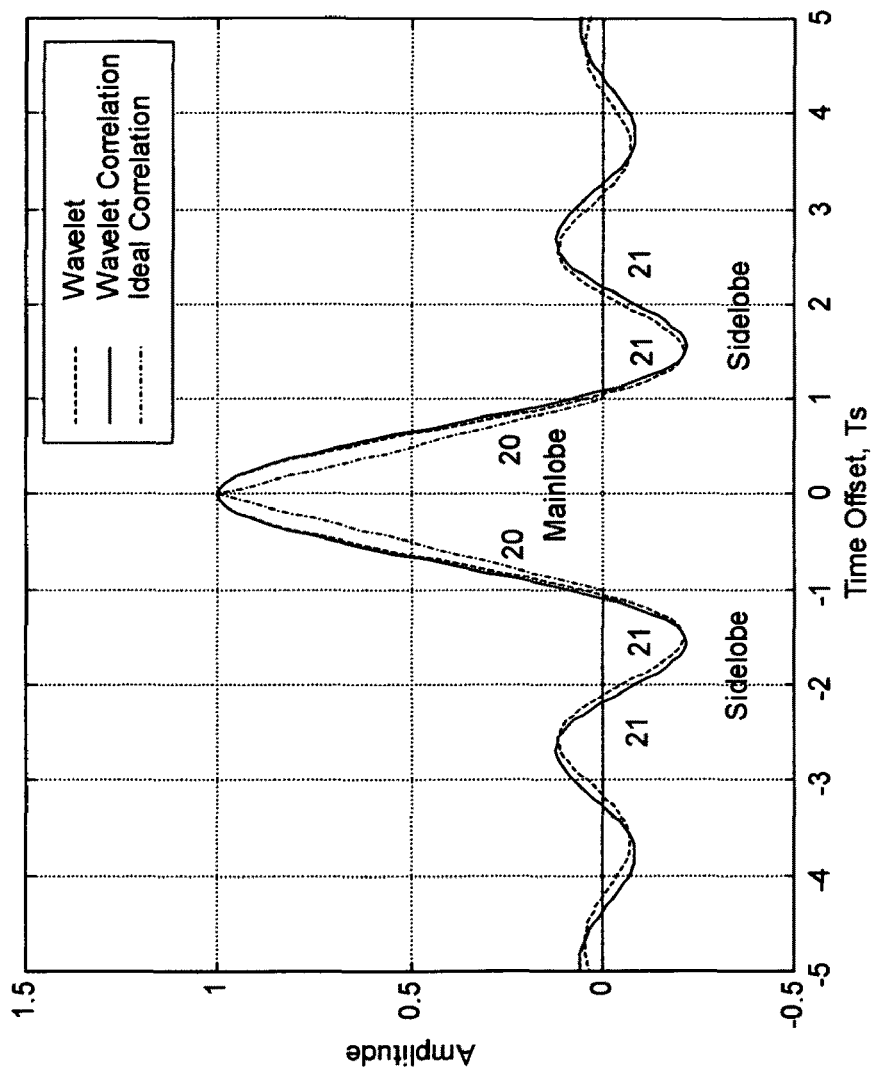
FIG. 6  OWDMA Wavelet waveform, correlation, and ideal correlation in time

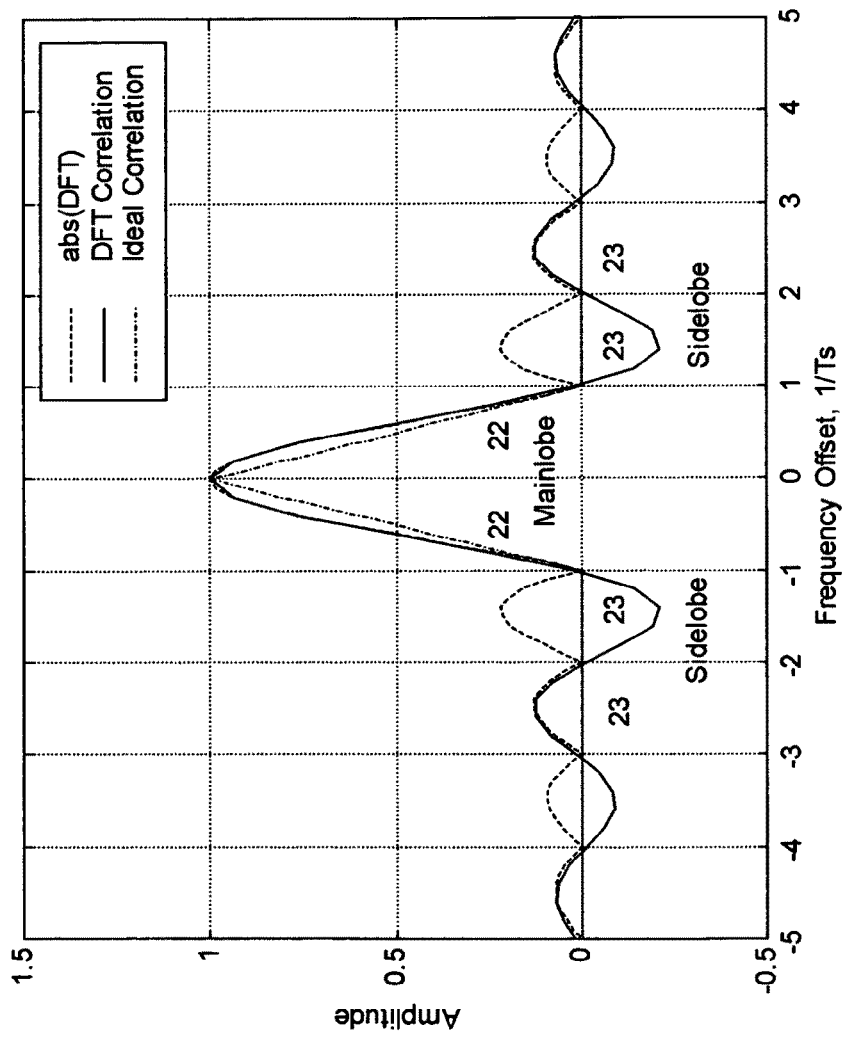
FIG. 7 OFDMA DFT waveform, correlation, and ideal correlation in frequency

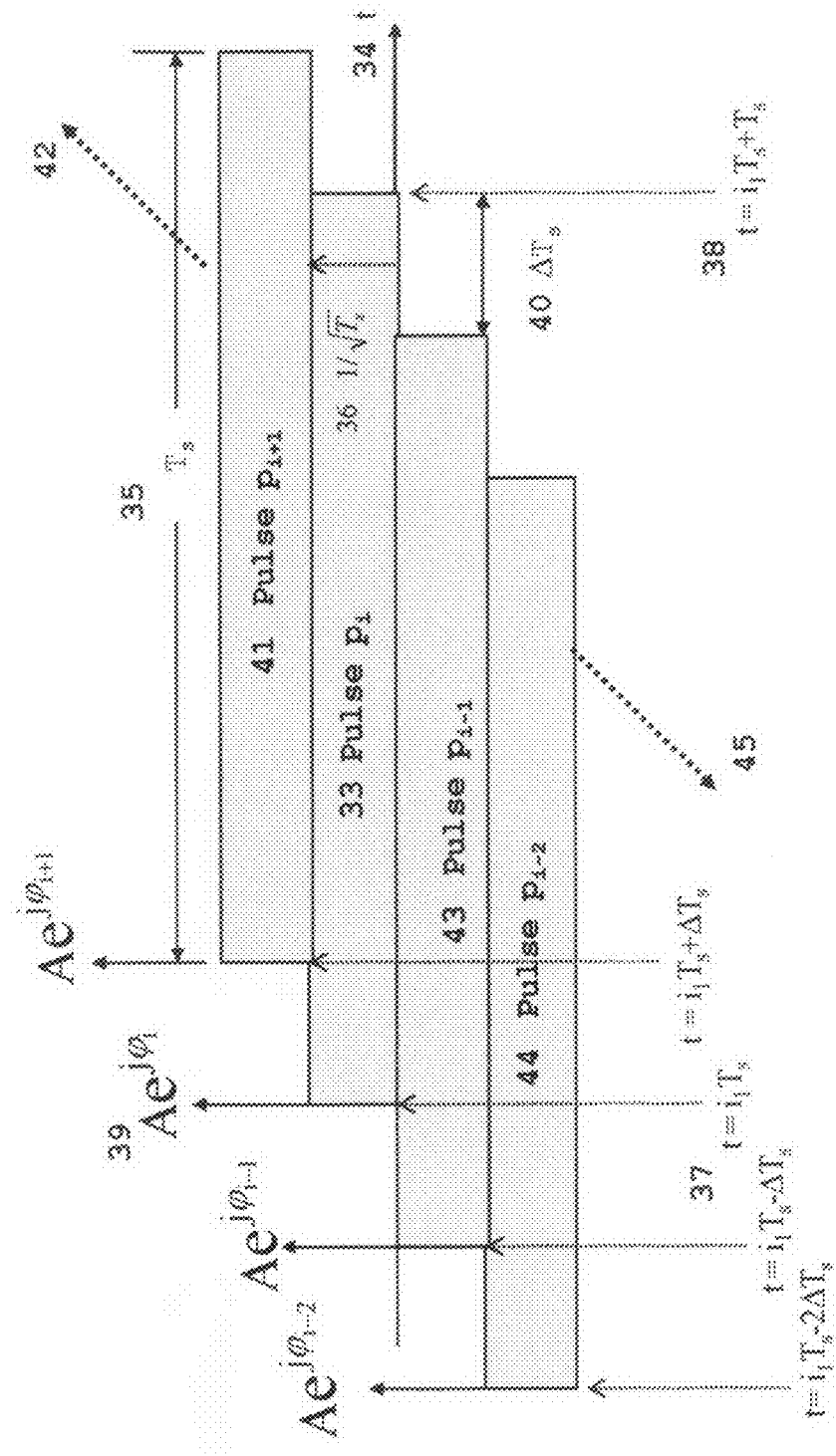
FIG. 8 QIM complex baseband modulation signal for ideal pulse waveform

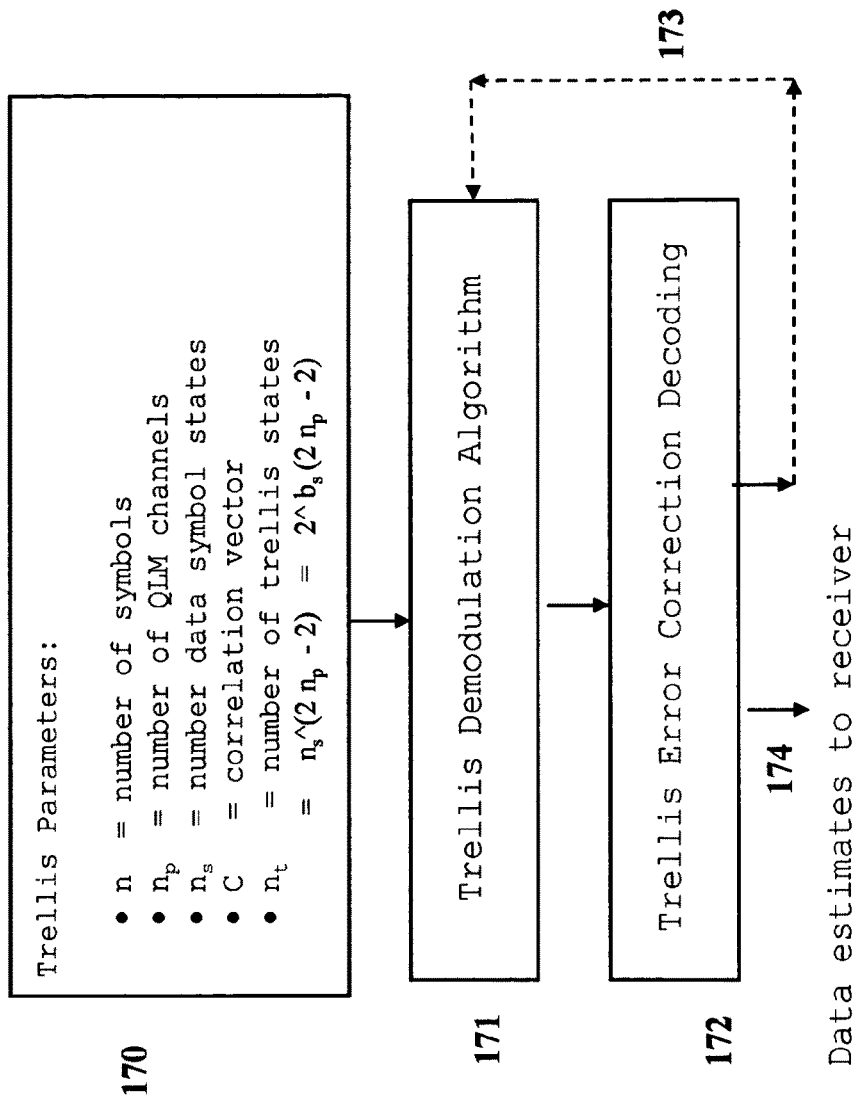
FIG. 9A QLM Trellis Symbol Algorithm

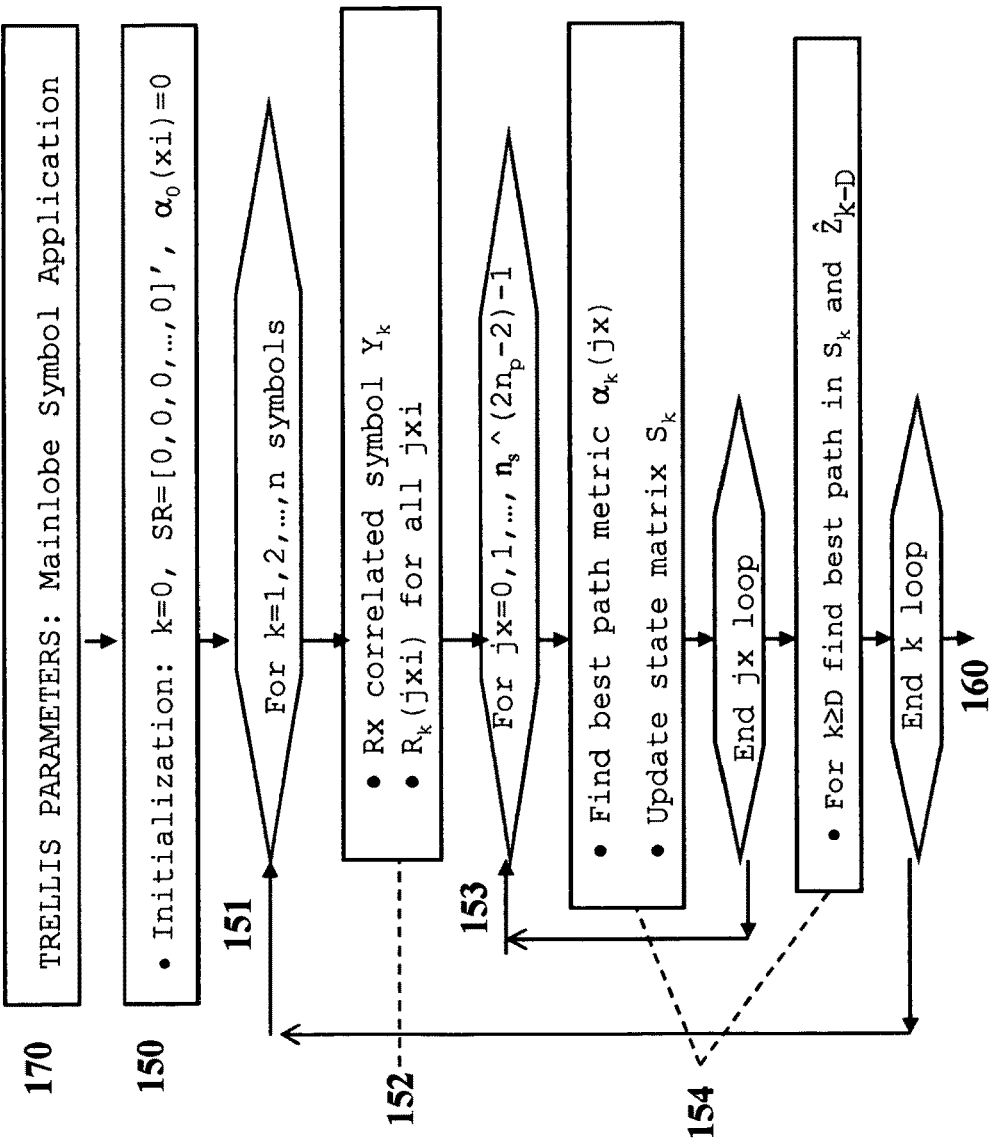
FIG. 9B Trellis Algorithm - Continued

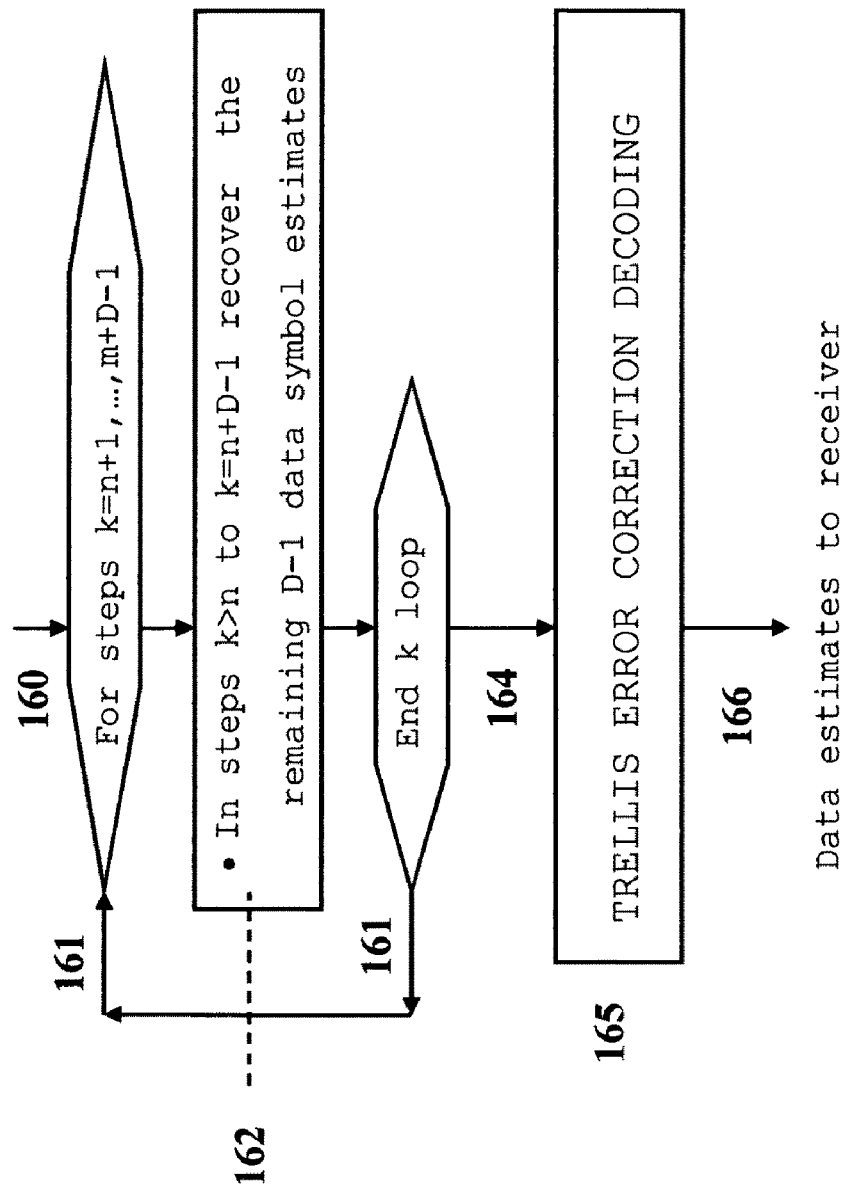
FIG. 9C Trellis Algorithm - Continued

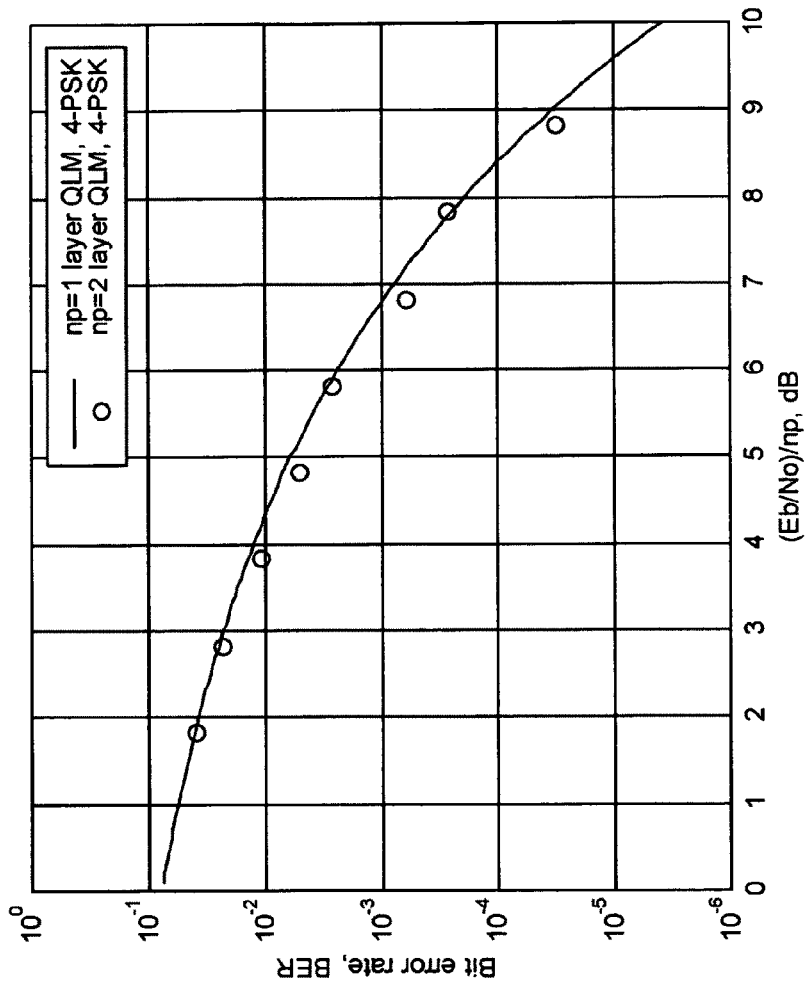
FIG. 10  QLM BER Performance for uncoded QLM for 4-PSK, $n_p = 1, 2$ layers

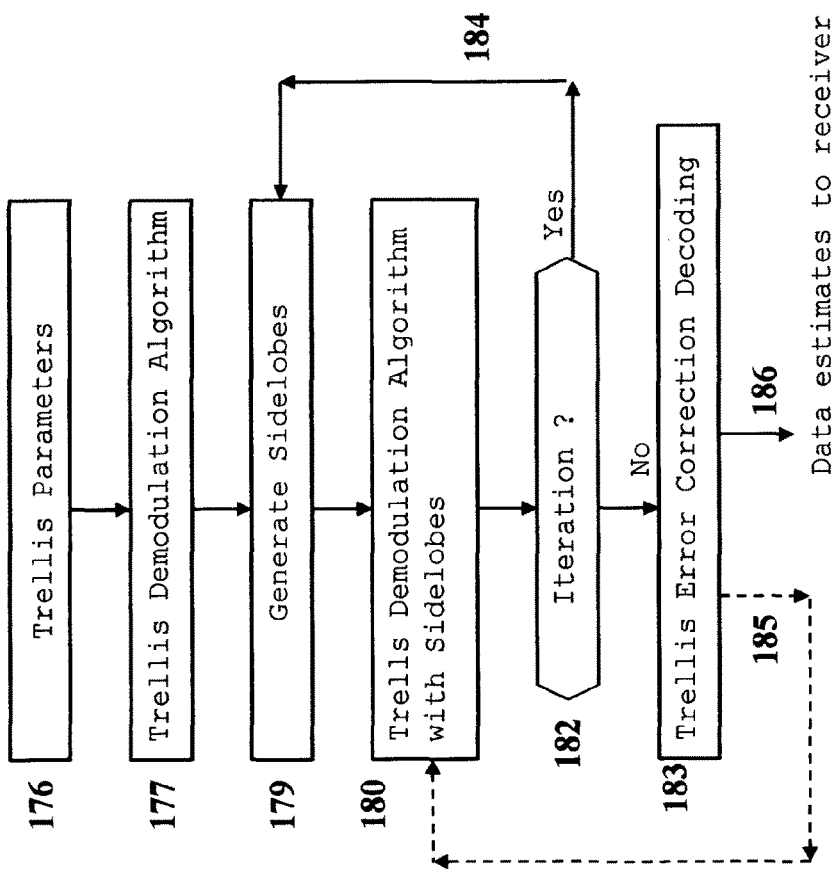
FIG. 11 QLM Trellis Symbol Iterative Algorithm

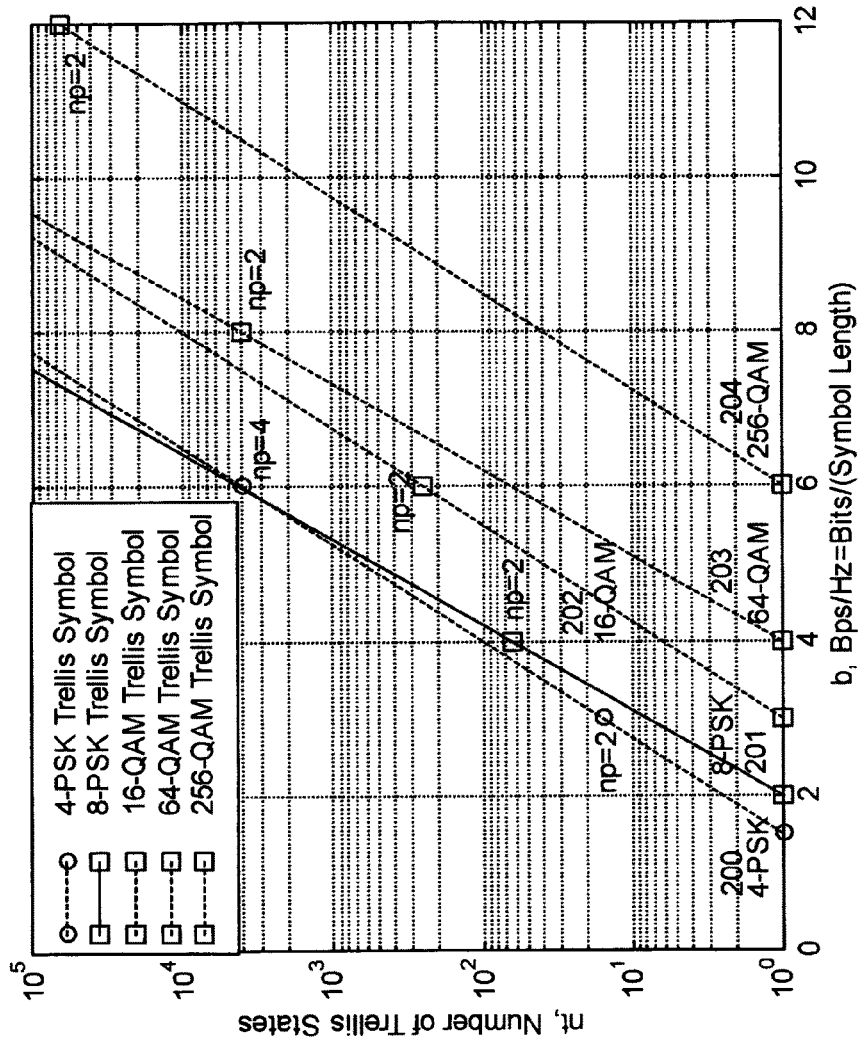
FIG. 12  Trellis Symbol Algorithm Complexity Metric: Number of Trellis Paths vs. b

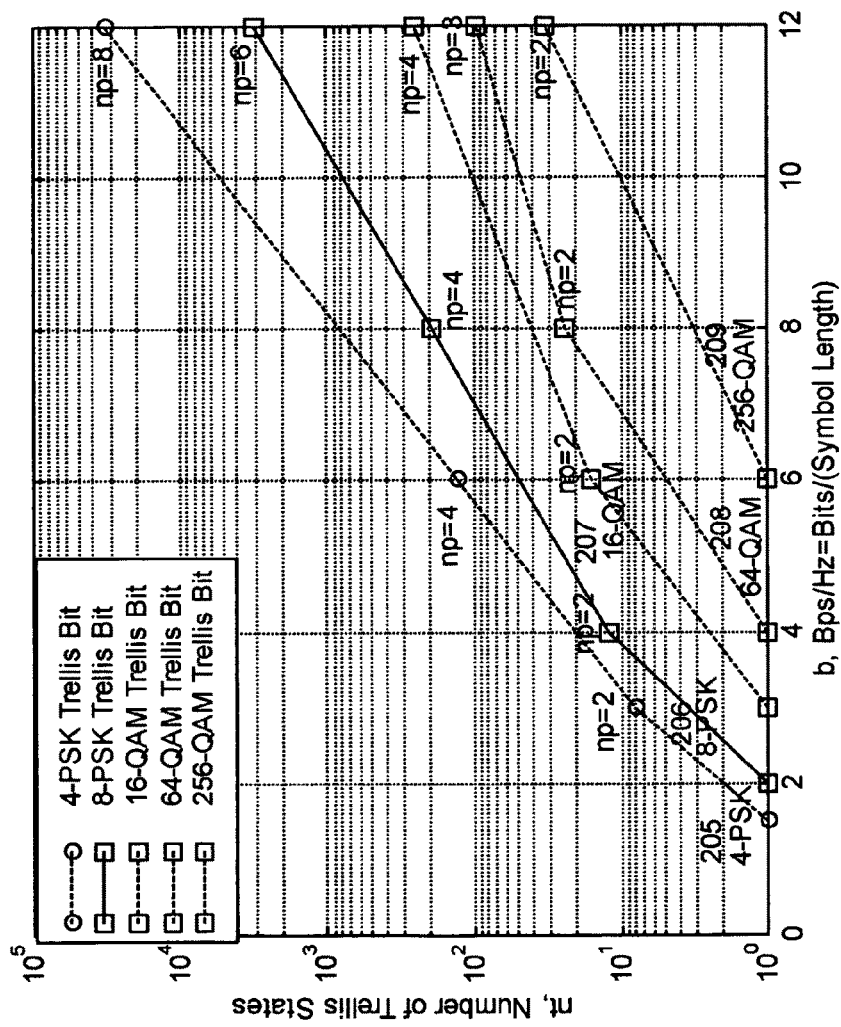
FIG. 13  Trellis Bit Algorithm Complexity Metric: Number of Trellis States vs. b

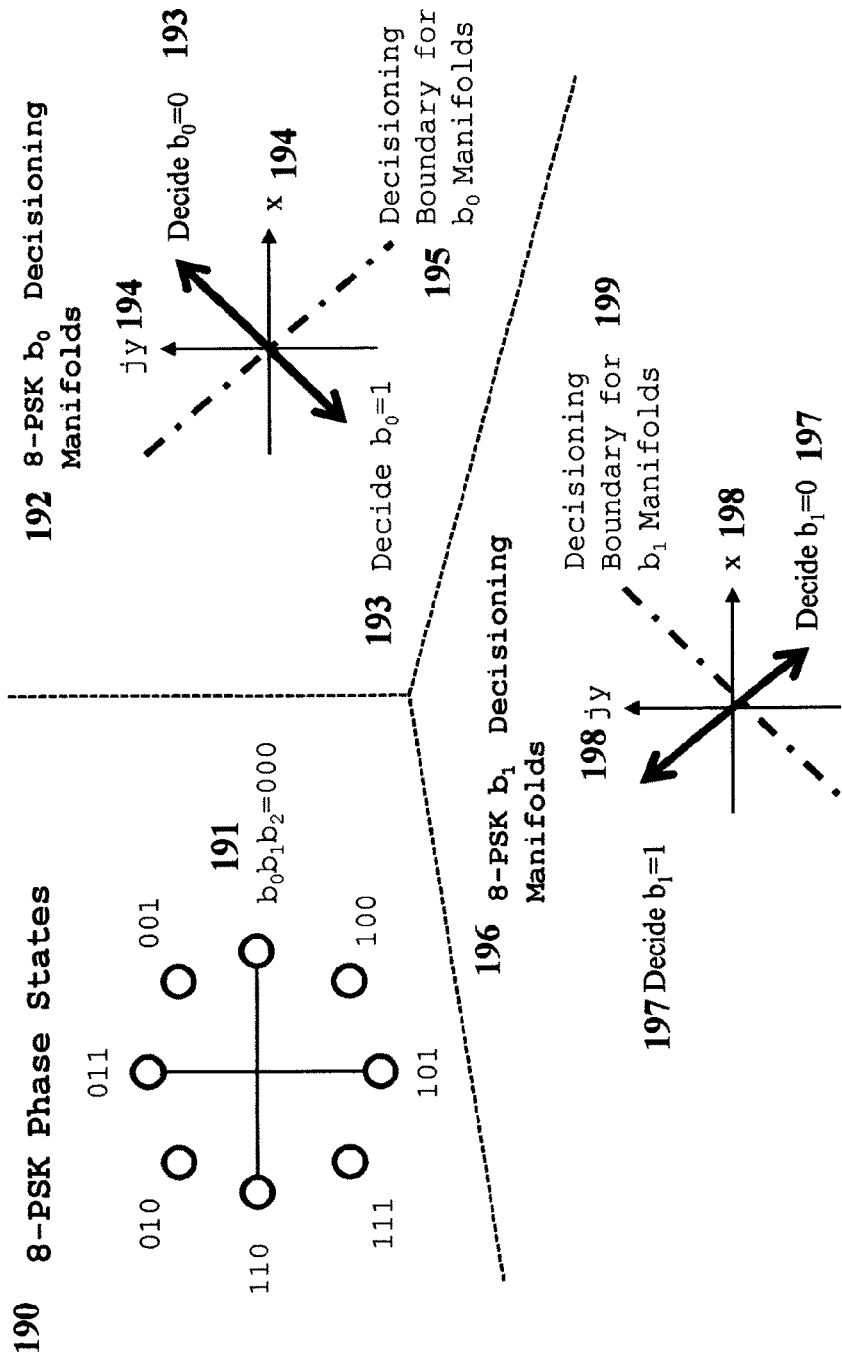
FIG. 14 Bit Decisioning Manifolds: 8-PSK Example

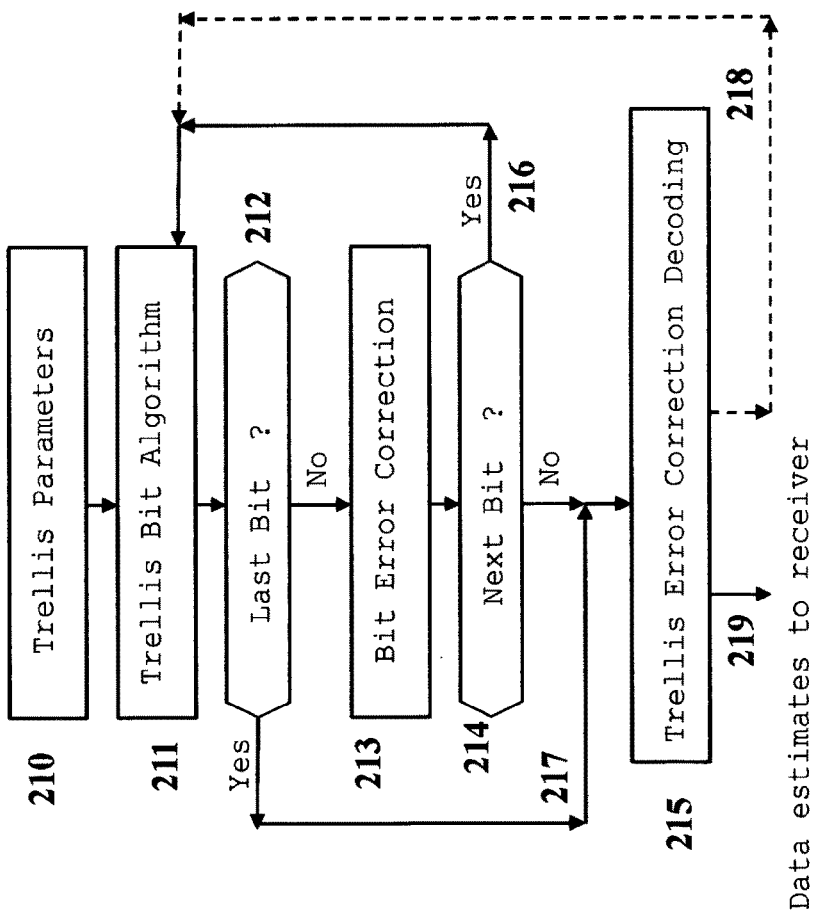
FIG. 15  QLM Trellis Bit Algorithm

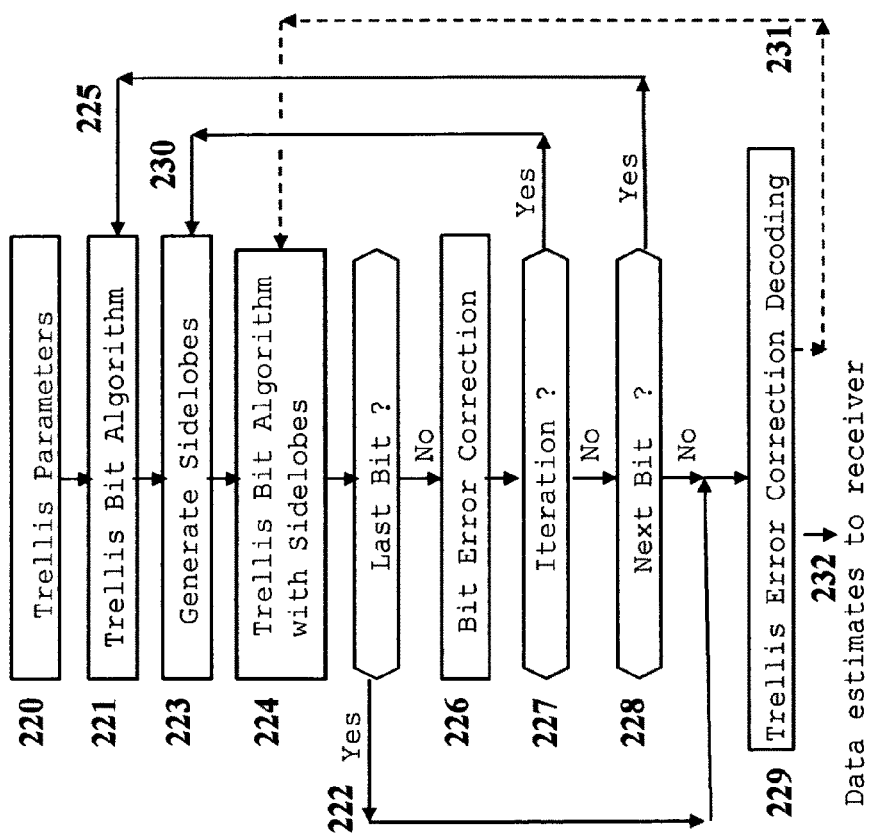
FIG. 16 QLM Trellis Bit Iterative Algorithm

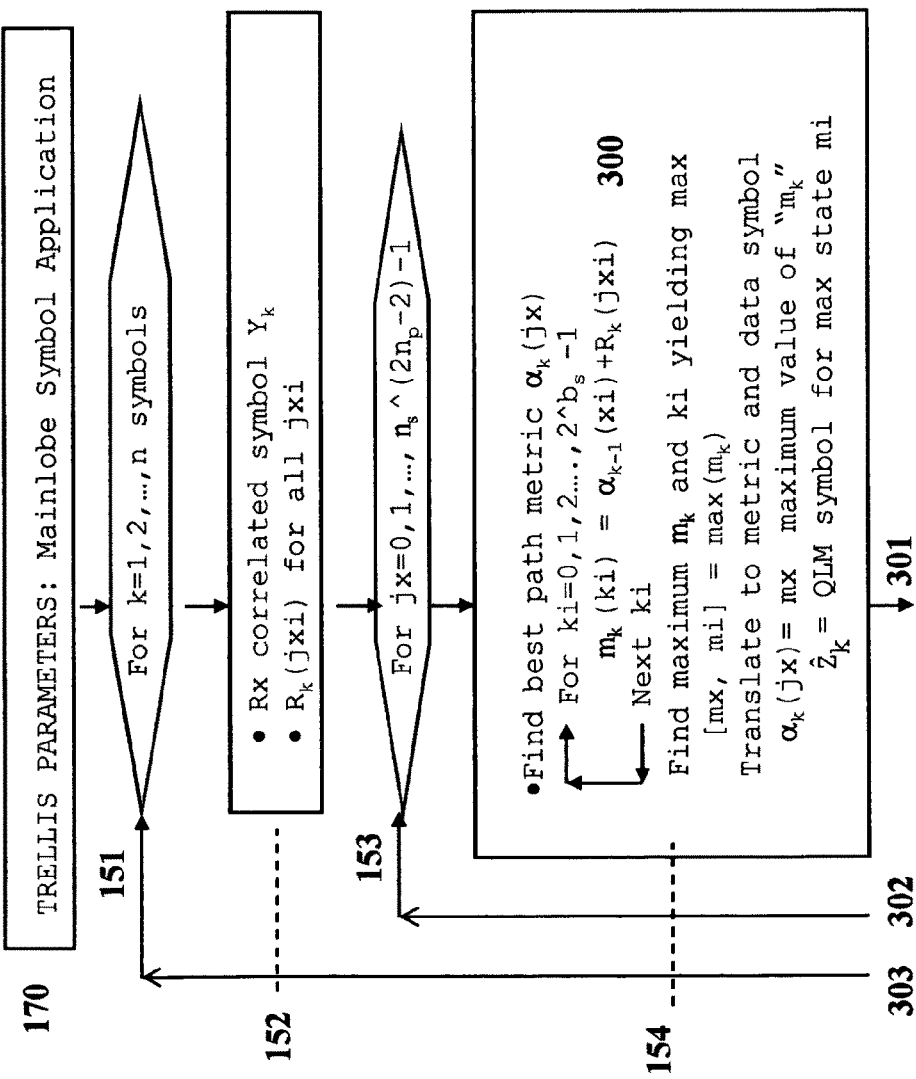
FIG. 17A QLM Soft Decisioning Metrics

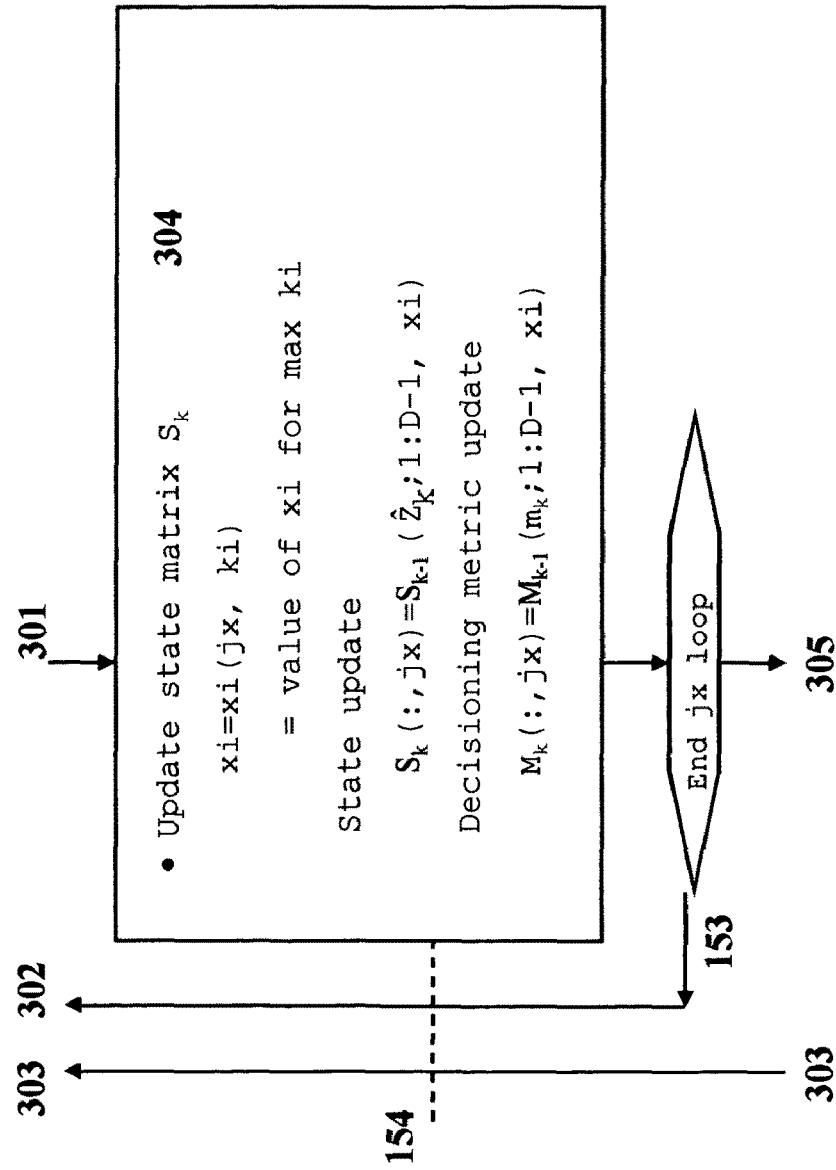
FIG. 17B QLM Soft Decisioning Metrics - Continued

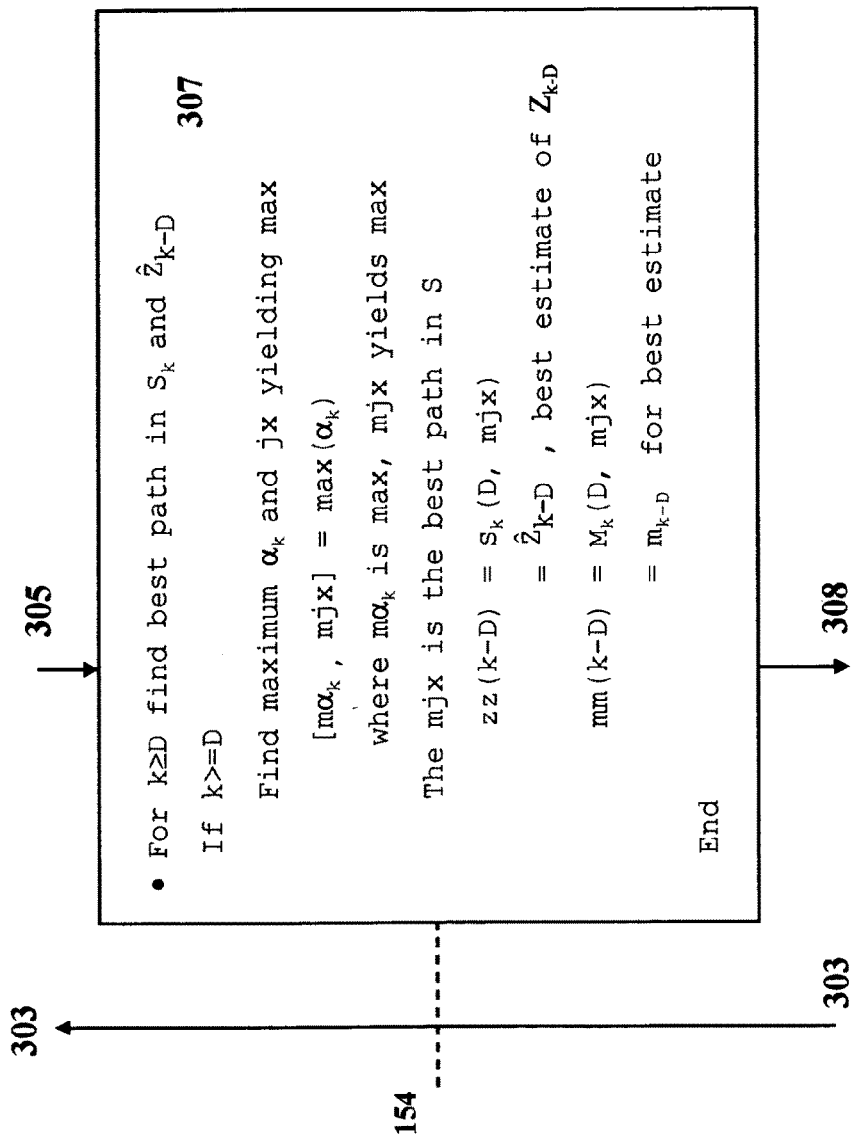
FIG. 17C QLM Soft Decisioning Metrics - Continued
- For $k \geq D$ find best path in $S_k$ and $\hat{Z}_{k-D}$
  If $k \geq D$
  Find maximum $\alpha_k$ and $jx$ yielding max
  $[m\alpha_k, mjx] = \max(\alpha_k)$,
  where $m\alpha_k$ is max, $mjx$ yields max
  The $mjx$ is the best path in $S$
  $zz(k-D) = S_k(D, mjx)$
  $\hat{Z}_{k-D} = $ , best estimate of $Z_{k-D}$
  $mm(k-D) = M_k(D, mjx)$
  $= m_{k-D}$ for best estimate
  End

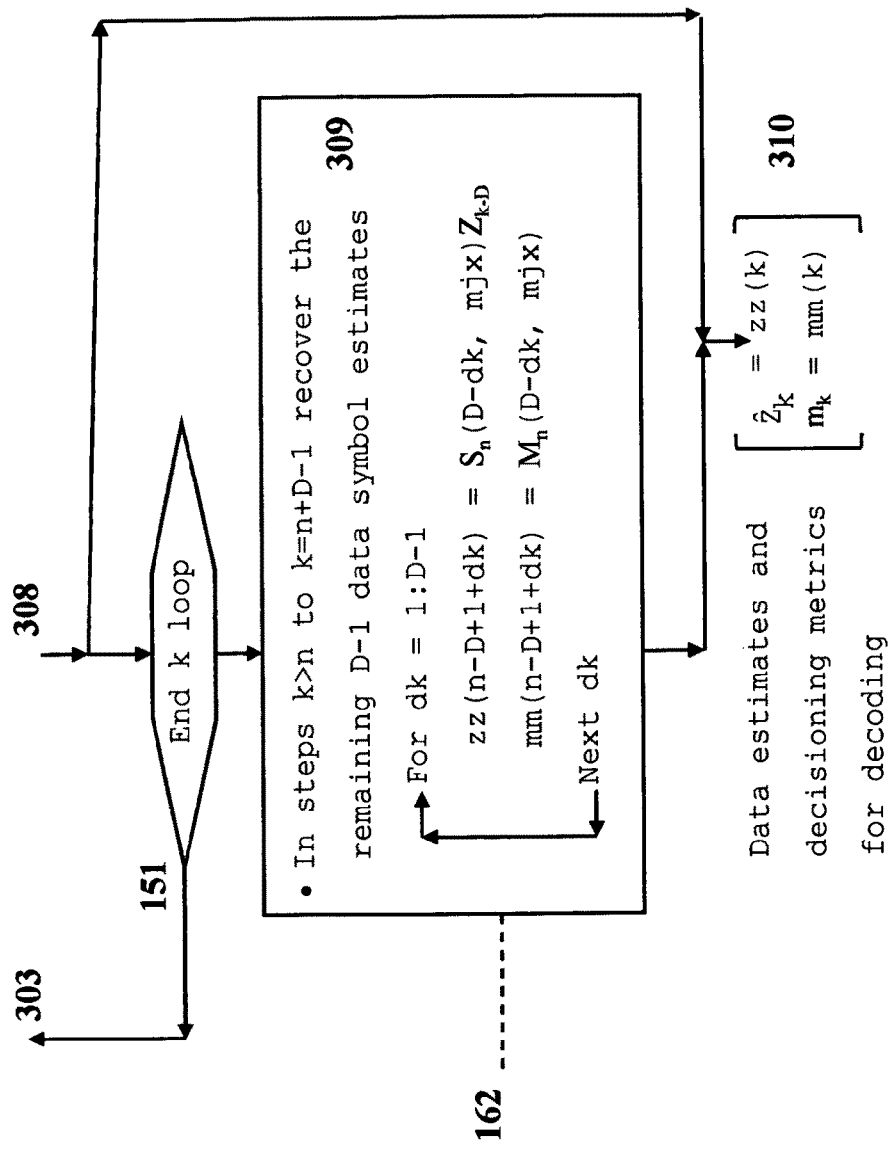
FIG. 17D QLM Soft Decisioning Metrics - Continued

FIG. 18A QLM Decoding Architectures: Transmitter
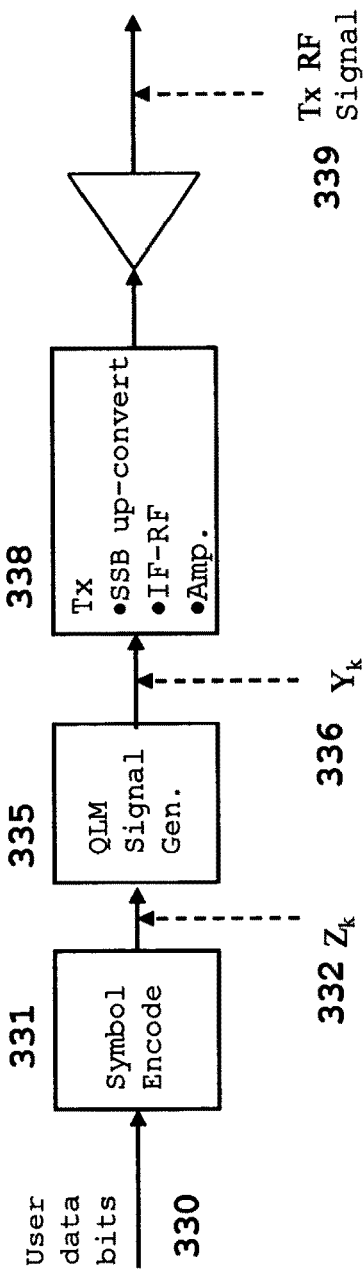

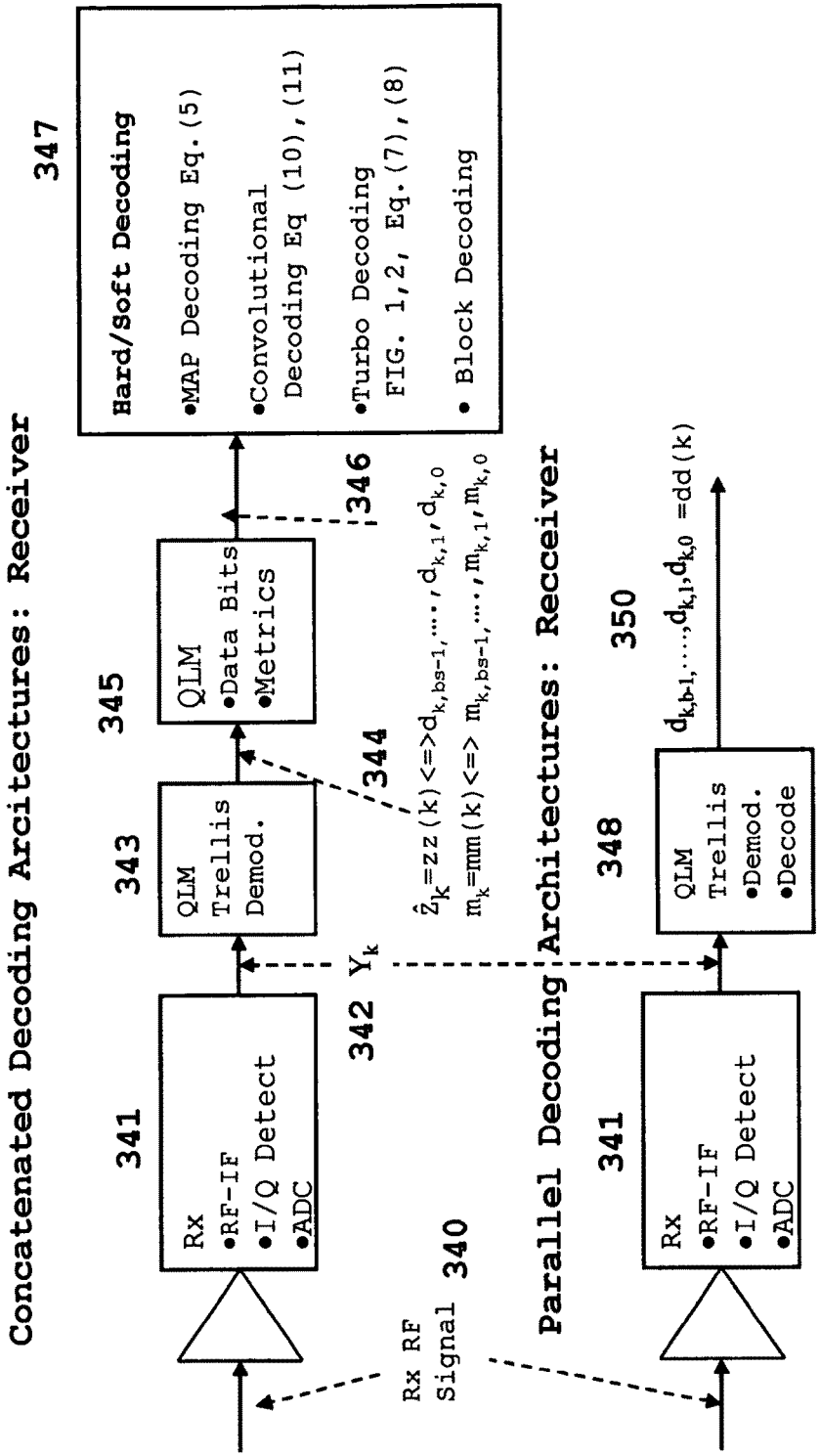
FIG. 18B QLM Decoding Architectures: Receiver

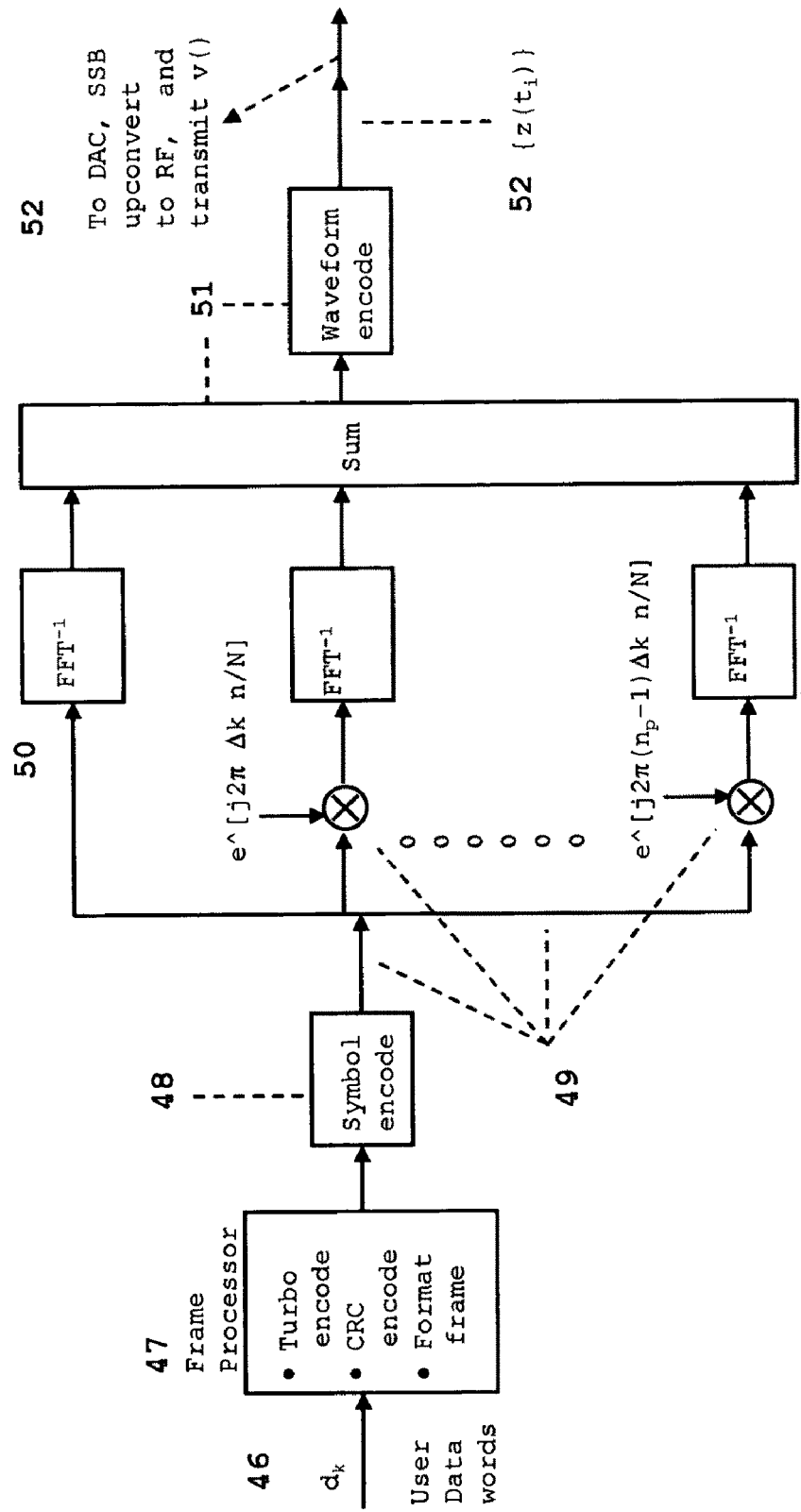
FIG. 19 QLM Transmitter Block Diagram for OFDMA

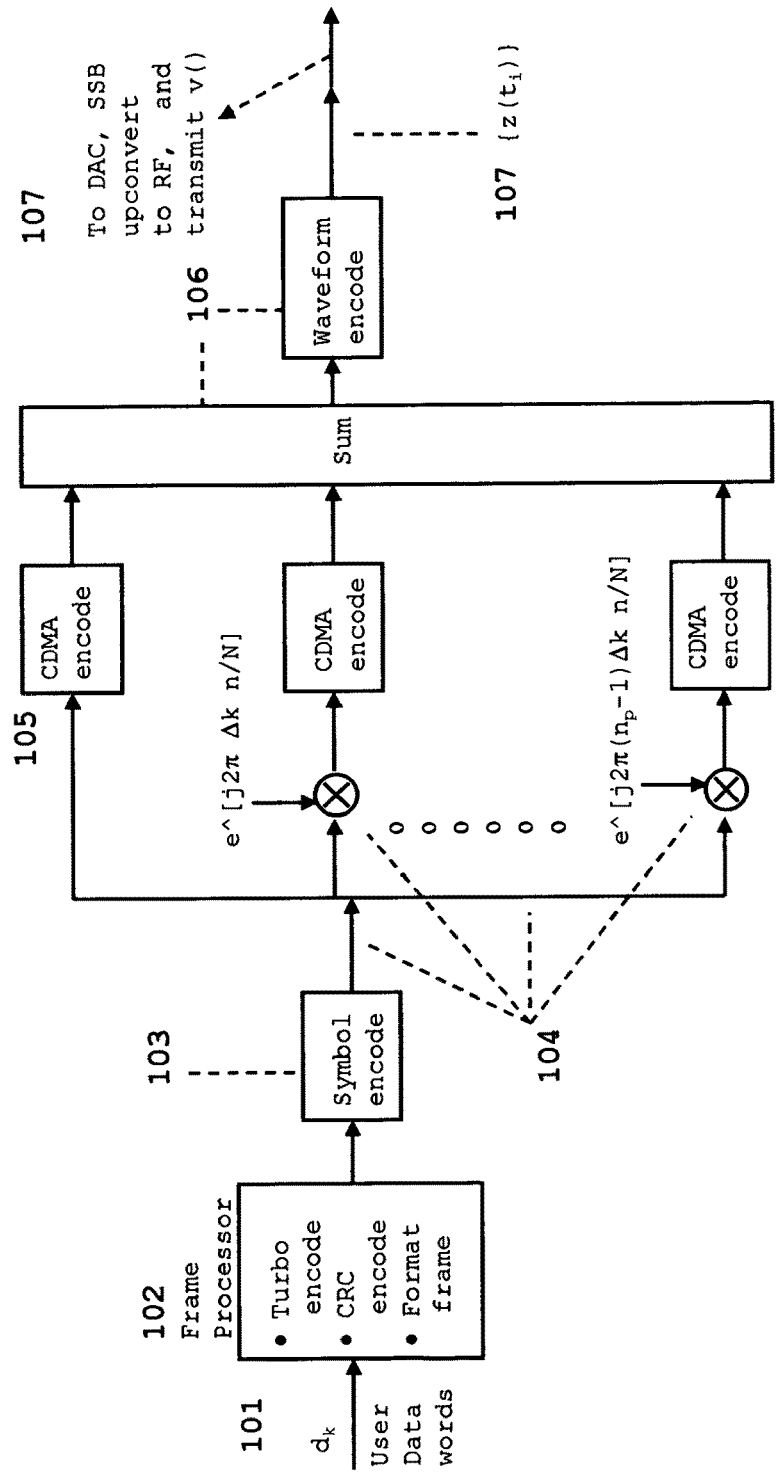
FIG. 20 QLM Transmitter Block Diagram for CDMA

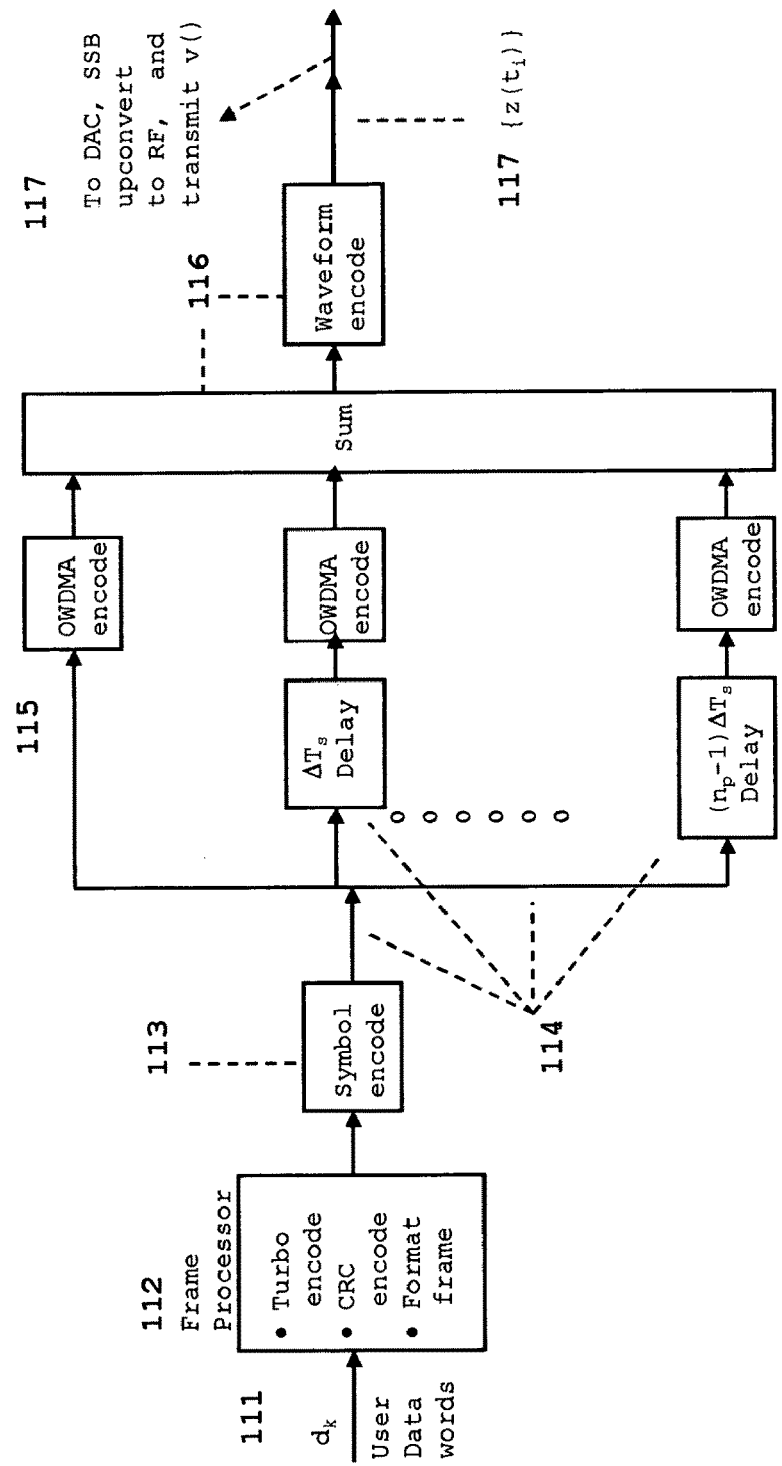
FIG. 21 QLM Transmitter Block Diagram for OWDMA

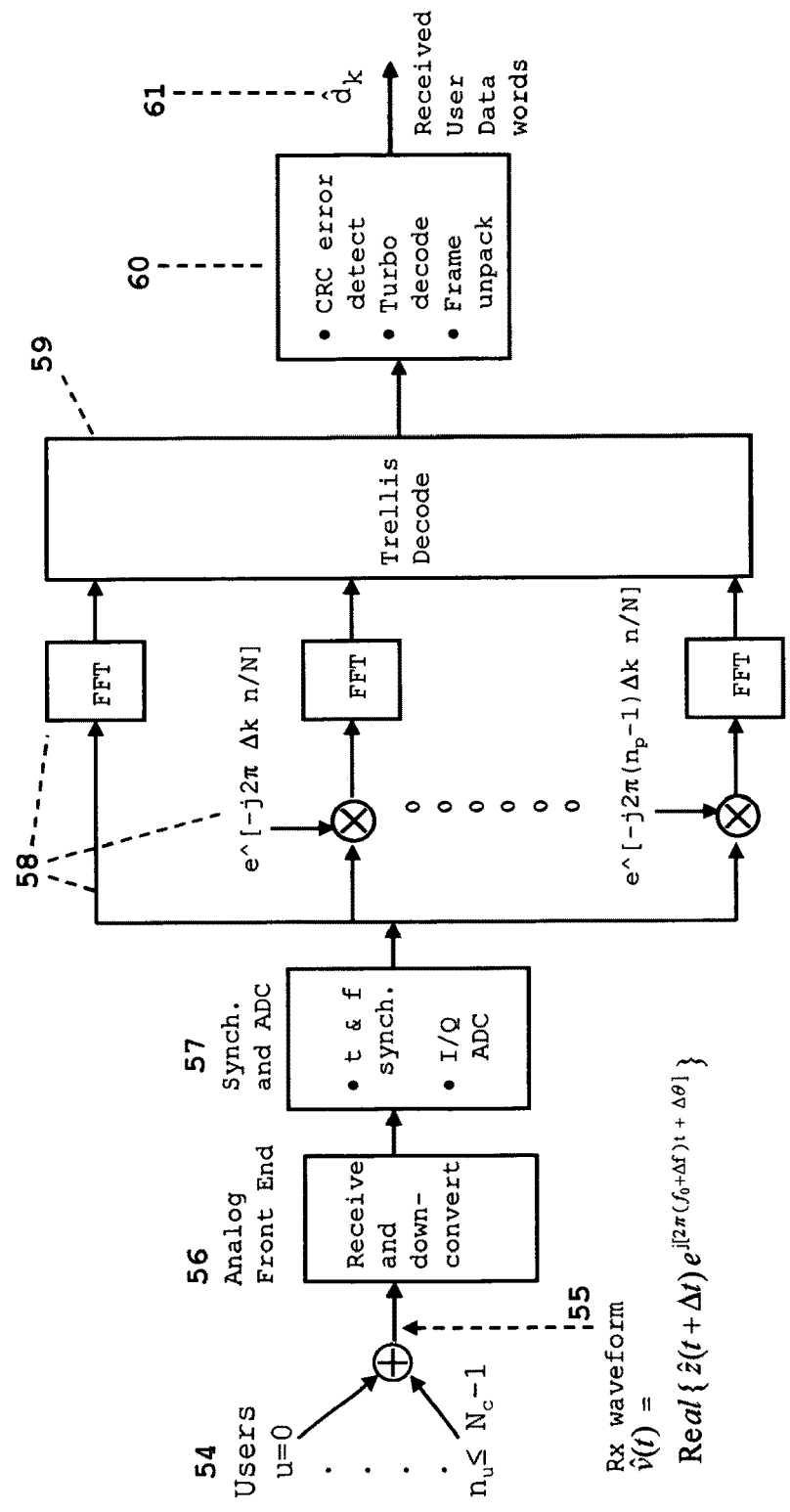
FIG. 22 QLM Receiver Block Diagram for OFDMA

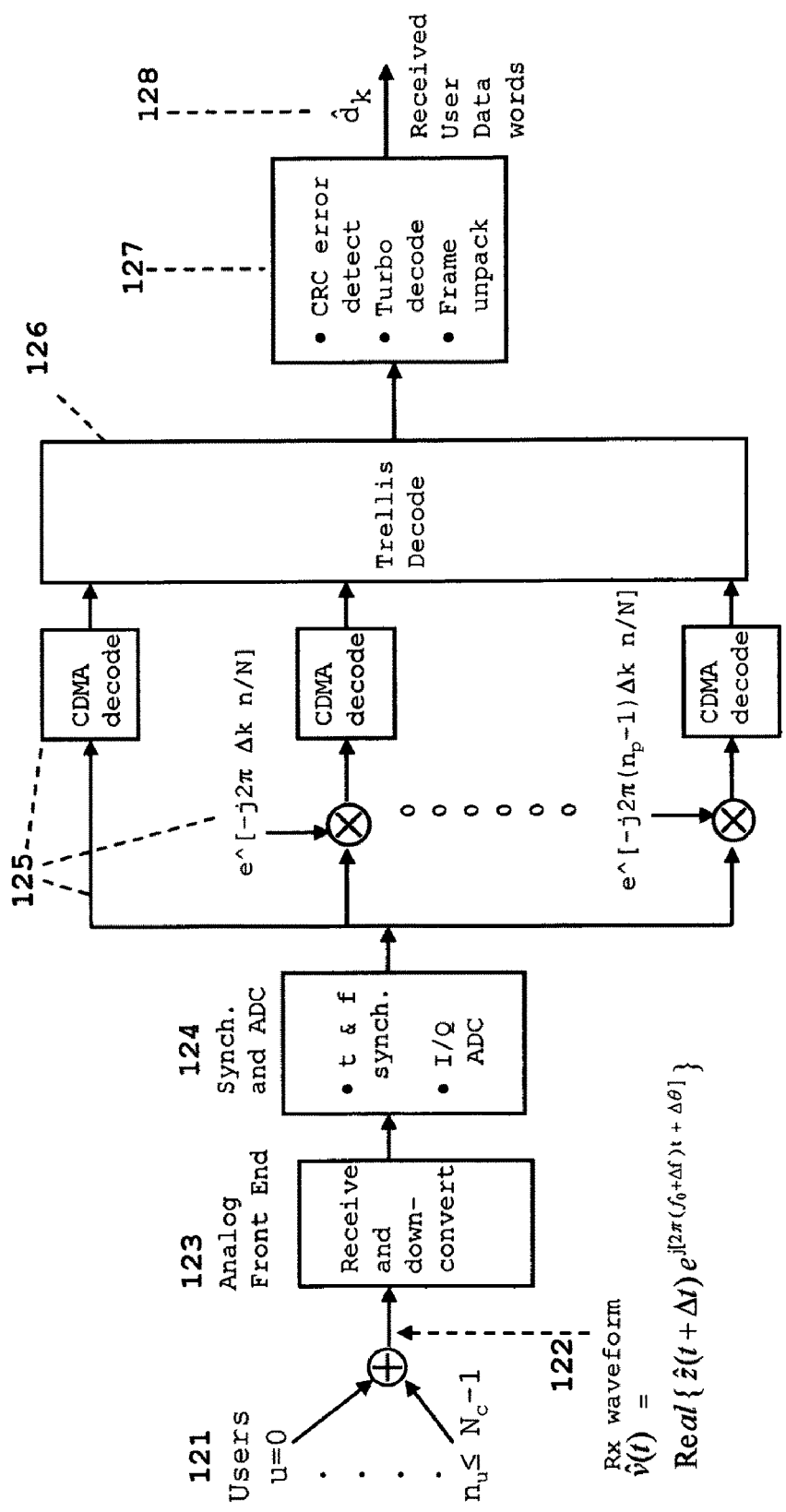

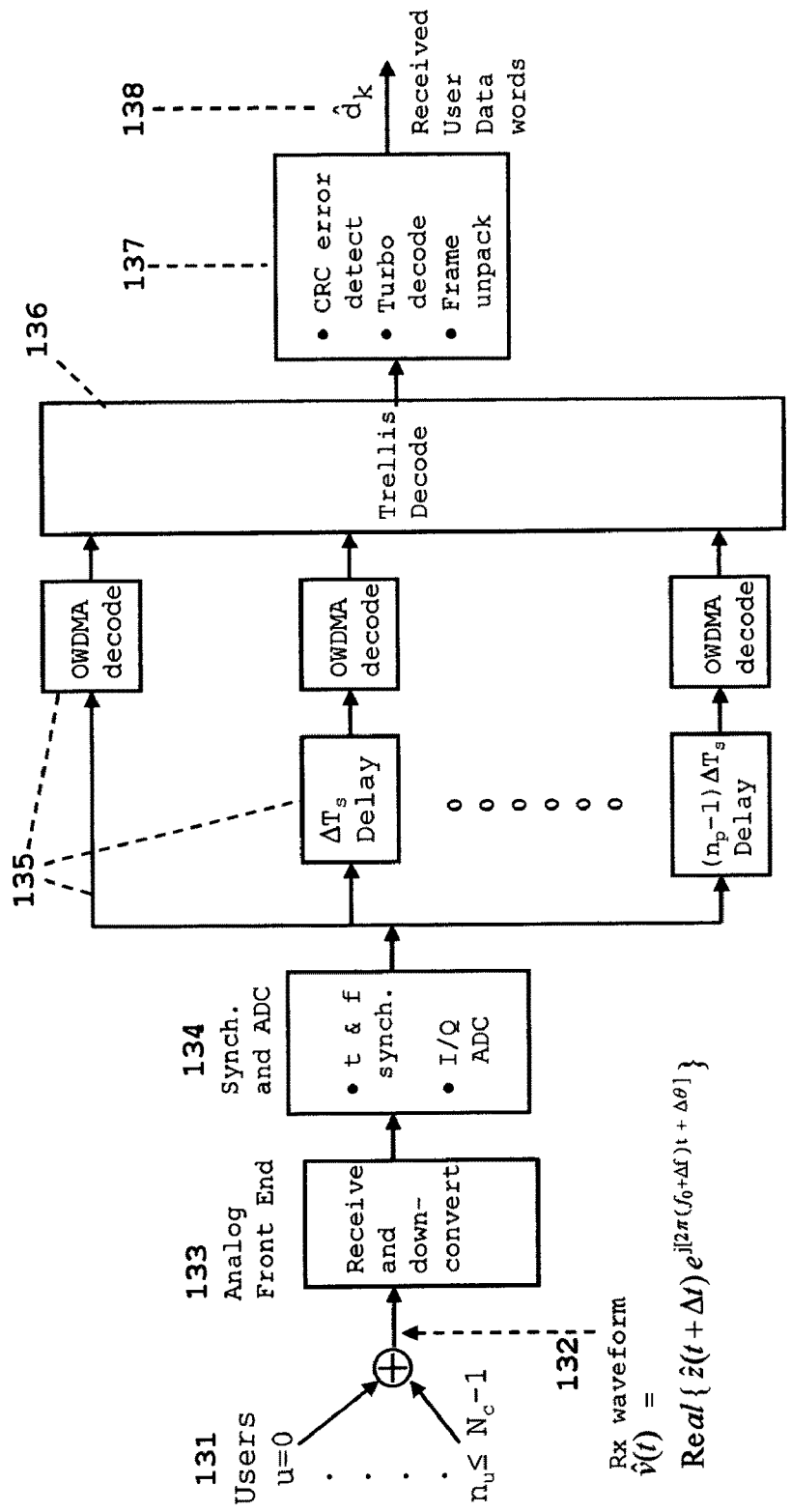
FIG. 24 QLM Receiver Block Diagram for OWDMA

QLM DECODING

This patent application is a continuation in part of application Ser. No. 09/826,118 filed on Jan. 9, 2001 now U.S. Pat. No. 7,376,688 and Ser. No. 10/266,256 filed on Oct. 8, 2002 now U.S. Pat. No. 7,391,819 and application Ser. No. 10/069,418 filed on Feb. 25, 2002 now abandoned.

BACKGROUND OF THE INVENTION

I. Field of the Invention

The present invention relates to the Shannon bound on communications capacity and also relates to symbol modulation and demodulation and convolutional and turbo encoding and decoding for high-data-rate wired, wireless, and optical communications and includes the symbol modulations phase-shift-keying PSK, quadrature amplitude modulation QAM, bandwidth efficient modulation BEM, gaussian minimum shift keying GMSK, pulse position modulation PPM, and the plurality of current and future modulations for single links and multiple access links which include time division multiple access TDMA, frequency division multiple access FDMA, code division multiple access CDMA, spatial division multiple access SDMA, frequency hopping FH, optical wavelength division multiple access WDMA, orthogonal Wavelet division multiple access OWDMA, combinations thereof, and the plurality of radar, optical, laser, spatial, temporal, sound, imaging, and media applications. Communication application examples include electrical and optical wired, mobile, point-to-point, point-to-multipoint, multipoint-to-multipoint, cellular, multiple-input multiple-output MIMO, and satellite communication networks.

II. Description of the Related Art

The Shannon bound is the Shannon capacity theorem for the maximum data rate C and equivalently can be restated as a bound on the corresponding number of modulation bits per symbol as well as a bound on the communications efficiency and is complemented by the Shannon coding theorem. From Shannon's paper "A Mathematical Theory of Communications" Bell System Technical Journal, 27:379-423, 623-656, October 1948 and B. Vucetic and J. Yuan's book "Turbo Codes", Kluwer Academic Publishers 2000, the Shannon (Shannon-Hartley theorem) capacity theorem, the corresponding Shannon bound on the information bits b per symbol, the Shannon bound on the communications efficiency $\eta$, and the Shannon coding theorem can be written as equations (1).

---

Shannon bounds and coding theorem (1)
1   Shannon capacity theorem
    $C = B \log_2(1 + S/N)$ = Channel capacity in bits/second=Bps
    for an additive white Gaussian noise AWGN
    channel with bandwidth B wherein "$\log_2$"
    is the logarithm to the base 2

= Maximum rate at which information can be
    reliably transmitted over a noisy channel
    where S/N is the signal-to-noise ratio in B 2   Shannon bound on b, $\eta$, and $E_b/N_o$
    $\max\{b\} = \max\{C/B\}$ $= \log_2(1 + S/N)$ $= \max(\eta)$ $E_b/N_o = [2^{\max\{b\}} - 1]/\max\{b\}$ wherein   b = C/B, Bps/Hz=Bits/symbol $\eta = b/T_sB$, Bps/Hz $T_s$ = symbol interval 3   Shannon coding theorem for the information bit rate $R_b$
    For $R_b < C$ there exists codes which support reliable
       communications
    For $R_b > C$ there are no codes which support reliable
       communications

---

Using the assumption that the symbol rate $1/T_s$ is maximized which means $1/T_s$=Nyquist rate=bandwidth B and is equivalent $T_sB=1$, enables 1 in equations (1) defining C to be rewritten to calculate max{b} as a function of the signal-to-noise ratio S/N, and to calculate $E_b/N_o$ which is the ratio of energy per information bit $E_b$ to the noise power density $N_o$, as a function of the max{b} in 2 and wherein max{b} is the maximum value of the number of information bits per symbol b. Since the communications efficiency $\eta = b/(T_sB)$ in bits/sec/Hz it follows that maximum values of b and are equal. The derivation of the equation for $E_b/N_o$ uses the definition $E_b/N_o=(S/N)/b$ in addition to 1 and 2. Reliable communications in the statement of the Shannon coding theorem 3 means an arbitrarily low bit error rate BER.

Turbo decoding is introduced in equations (2) along with the current MAP (maximum a-posteriori probability) joint probability p(s',s,y) used for MAP turbo decoding {1},{2}, and the a-posteriori probability of s,s' given the observations y expressed as the MAP probability p(s,s'|y) and used in a new formulation for MAP turbo decoding in U.S. Pat. No. 7,337,383 B1. We find

---

MAP joint probability for turbo decoding (2)
1 Definitions

S(k)  = Decoder trellis state at clock k

= Decoder shift register state at clock k k     = Index of received codewords

= trellis decoder states

= decoding clock s', s = Values of S(k-1), S(k) respectively y     = Set of observed channel output symbols = {y(k), k=1, 2, ... , N}

RSC   = Recursive systematic code

= Systematic code SC with feedback which is a
           requirement for turbo decoding Parallel encoding = Encoding configuration for turbo
           decoding which transmits the symbols using a
           parallel architecture, which is the assumed
           architecture for this invention disclosure y(k)   = Output symbols for codeword/clock k {y(j<k)} = Output symbols for clocks j=1, 2, ... , k-1

{y(j>k)} = Output symbols for clocks $j=k+1, 2, \ldots, N$

2 Decoding states and observations

Observations are the set $\{y(k), k=1, 2, \ldots, N\}$

|--------------------/--------------------|
1         $k=1, 2, \ldots, N$         N Subsets $y(j<k), y(k), y(j>k)$ of y are of interest

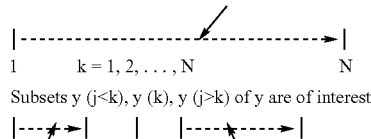

$y(j<k)$       $y(k)$       $y(j>k)$

Decoder trellis states of interest are s', s

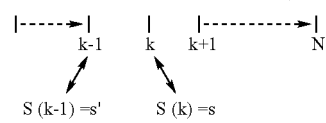

$S(k-1) = s'$     $S(k) = s$

3 Current MAP joint probability $$p(s', s, y) = p(s', s, y(j<k), y(k), y(j>k))$$
$$= \beta_k(s) \; \gamma_k(s, s') \; \alpha_{k-1}(s')$$

wherein by definition $\beta_k(s) \quad = p(y(j>k) \mid s)$ $\gamma_k(s, s') \quad = p(s, y(k) \mid s')$ $\alpha_{k-1}(s') = p(s', y(j<k))$ 4 New MAP conditional probability $$p(s, s' \mid y) = p(s, s' \mid y(j<k), y(k), y(j>k))$$
$$= \beta_k(s) \; \gamma_k(s \mid s') \; \alpha_{k-1}(s')$$

wherein by definition $\beta_k(s) \quad = p(s \mid y(j>k))$ $\gamma_k(s \mid s') \quad = p(s \mid s', y(k))$ $\alpha_{k-1}(s') = p(s' \mid y(j<k))$ wherein in 2 the decoding states s',s are defined at clocks k−1,k and the observations are defined over the $j=1, 2, \ldots, k-1$ as $y(j<k)$, over $j=k+1, \ldots, N$ as $y(j>k)$, and at k as $y(k)$. In 3 the MAP joint probability p(s',s,y) expressed as a function of these decoder states and observations is defined as a product of the recursive state estimators α,β and the state transition probability γ. In 4 the new MAP a-posteriori probability p(s,s'|y) is defined as a product of the recursive state estimators α,β and the state transition probability γ using the same notation as in 3 in equations (2) for convenience and wherein p(s,s'|y) reads the probability "p" of "s,s'" conditioned on "y".

MAP forward recursive equations used to evaluate the state estimator $\alpha_k(s)$ is defined in equations (4) in 1a for the current MAP estimator and in 1b for the new MAP estimator, and backward recursive equations used to evaluate the state estimator $\beta_{k-1}(s')$ are defined in 2a for the current MAP estimator and in 2b for the new MAP estimator. We find Forward and backward recursive metric equations    (3)
1 Forward recursive equation for $\alpha_k(s)$
   1a Current MAP
      $\alpha_k(s) = \Sigma_{all \; s'} \, \gamma_k(s, s') \, \alpha_{k-1}(s')$
   1b New MAP
      $\alpha_k(s) = \Sigma_{all \; s'} \, \gamma_k(s \mid s') \, \alpha_{k-1}(s')$
2 Backward recursive equation for $\beta_{k-1}(s')$
   2a Current MAP
      $\beta_{k-1}(s') = \Sigma_{all \; s} \, \beta_k(s) \, \gamma_k(s, s')$
   2b New MAP
      $\beta_{k-1}(s') = \Sigma_{all \; s} \, \beta_k(s) \, \gamma_k(s' \mid s)$ wherein the "$\Sigma_{all \; s'}, \Sigma_{all \; s}$" are the summations over all decoding states "s',s" defined at clocks "k−1,k" respectively.

MAP transition probabilities $\gamma_k(s,s')$ for the current MAP and $\gamma_k(s'|s)$ for the new MAP are defined in 1a,1b respectively in equations (4) assuming zero-mean Gaussian noise for the communications, and the natural logarithms (log) are defined in 2a,2b respectively for application to the forward and backward recursive equations to calculate the state metrics in the logarithm domain for the turbo decoding MAP equations. We find Natural and log transition probabilities    (4)
1 Transition probabilities 1a Current $\gamma_k(s, s')$ $\gamma_k(s, s') = p(y \mid x) \, p(x)$ $= P(X) \exp(-|y - x|^2 / 2\sigma^2) / (2\pi)^{1/2} \sigma$ 1b New $\gamma_k(s' \mid s)$ $\gamma_k(s, s') = p(x \mid y)$ $= p(x) \exp(Re[yx^*]/\sigma^2 - |x|^2 / 2\sigma^2) / \{(2\pi)^{1/2} \sigma\}$ 2 Log transition probabilities simplified 2a Log $\ln[\gamma_k(s, s')]$ simplified $\ln[\gamma_k(s, s')] = \underline{p}(x) - |y - x|^2 / 2\sigma$ $= \underline{p}(d) + DM(s, s')$ 2b Log $\ln[\gamma_k(s' \mid s)]$ simplified $\ln[\gamma_k(s' \mid s)] = \underline{p}(d) + Re[yx^*]/\sigma^2 - |x|^2 / 2\sigma^2)$ $= DX(s \mid s')$ wherein "DM" is the ML (Maximum Likelihood) decisioning metric for the current turbo and convolutional decoding algorithms defined in 2a, "DX" is the new decisioning metric for the new turbo and convolutional decoding equations defined in 2b, the "y" and "x" are evaluated at index "k", the probability p(x) is identical to the probability p(d) of the data symbol "d" at index "k" which allows the expression p(d) to be substituted for p(x), the natural logarithm of "p" is represented by "$\underline{p}$", the "$2\sigma^2$" is the one-sigma noise floor of the Gaussian noise, and the qualifier "simplified" in 3 and 4 means the additive constant terms are deleted since they are cancelled out in the logarithm recursive metric equations.

MAP convolutional decoding forward recursive metric equations (3) and (4) in logarithm format are used to calculate the log(natural logarithm) $\ln[\alpha_k(s)] = \underline{\alpha}_k(s)$ of $\alpha_k(s)$ in 1a, 1b in equations (5) for the current, new $\overline{MAP}$, and to calculate backward recursive metric equations for the log $\ln[\beta_{k-1}(s')] = \underline{\beta}_{k-1}(s')$ of $\beta_{k-1}(s')$ in 2a,2b for the current, new $\overline{MAP}$. We find MAP logarithm recursive metric equations     (5)
1 MAP log of forward metric $\alpha_k(s)$
   1a Current $\alpha_k(s)$
      $\alpha_k(s) = \ln[\Sigma_{all\ s'}\exp(\alpha_{k-1}(s')+DM(s|s')+\underline{p}(d(k))]$
   1b New $\alpha_k(s)$
      $\underline{a}_k(s) = \ln[\Sigma_{all\ s'}\exp(\underline{a}_{k-1}(s')+DX(s|s'))]$
3 MAP log of backward metric $\beta_{k-1}(s')$
   1a Current $\beta_{k-1}(s')$
      $\underline{\beta}_{k-1}(s') = \ln[\Sigma_{all\ s}\exp(\underline{\beta}_k(s)+DM(s|s')+\underline{p}(d(k))]$
   1b New $\underline{\beta}_{k-1}(s')$
      $\underline{\beta}_{k-1}(s') = \ln[\Sigma_{all\ s}\exp(\underline{\beta}_k(s)+DX(s'|s))]$ MAP equations for the log $L(d(k)|y)$ of the likelihood ratio abbreviated to "log likelihood ratio $L(d(k)|y)$" are derived from equations (1)-(5) for the current MAP and the new MAP. We find MAP log likelihood ratio $L(d(k) | y)$     (6)
1   Definition of $L(d(k) | y)$
    $L(d(k)) | y) = \ln[p(d(k)=+1|y)/p(d(k)=-1|y)]$
             = $\ln\{p(d(k)=+1|y)/]-\ln[p(d(k)=-1|y)]$ 2   Current $L(d(k) | y)$
    $L(d(k) | y) = \ln[p(d(k)=+1, y)]$
             $\ln[p(d(k)=-1, y)]$
    $= \ln\left[\sum_{(s,s'|d(k)=+1)} p(s, s', y)\right]$
     $- \ln\left[\sum_{(s,s'|d(k)=-1)} p(s, s', y)\right]$
    $= \ln\left[\sum_{(s,s'|d(k)=+1)} \exp(\alpha_{k-1}(s') + DM(s | s') + \underline{p}(d(k)) + \underline{\beta}_k(s))\right]$
     $- \ln\left[\sum_{(s,s'|d(k)=-1)} \exp(\alpha_{k-1}(s') + DM(s | s') + \underline{p}(d(k)) + \underline{\beta}_k(s))\right]$ 3   New $L(d(k) | y)]$
    $L(d(k)) | y) = \ln\left[\sum_{(s,s'|d(k)=+1)} p(s, s' | y)\right]$
     $- \ln\left[\sum_{(s,s'|d(k)=-1)} p(s, s' | y)\right]$
    $= \ln\left[\sum_{(s,s'|d(k)=+1)} \exp(\underline{a}_{k-1}(s') + DX(s | s') + \underline{b}_k(s))\right]$
     $- \ln\left[\sum_{(s,s'|d(k)=-1)} \exp(\underline{a}_{k-1}(s') + DX(s | s') + \underline{b}_k(s))\right]$ 4   Decisioning Rules
    Hard Decisioning: $d(k) = +1/-1$    when $L(d(k) | y) \geq 0 / < 0$
    Soft decision metric = $L(d(k)) | y)$ wherein the definition in 1 is from references [1],[2], in 2 the first equation uses the Bayes rule $P(a,b)=P(a|b)P(b)$ with the $p(y)$ cancelled in the division, in 2 the second equation replaces $p(d(k))$ with the equivalent sum of the probabilities that the transition from $S(k-1)=s'$ to $S(k)=s$ occurs for $d(k)=+1$ and for $d(k)=-1$, and in 2 the third equation substitutes the equations for the recursive estimators $\alpha_k(s)$, $\beta_{k-1}(s')$, $\gamma_k(s,s')$. In 3 the first equation replaces $p(d(k))$ with the equivalent sum of the probabilities that the transition from $S(k-1)=s'$ to $S(k)=s$ occurs and which are the new probabilities $p(s,s'|y)$ over these transitions, and in 3 the second equation substitutes the equations for the recursive estimators $\alpha_k(s)$, $\beta_{k-1}(s')$, $\gamma_k(s|s')$. In 4 the hard decisioning rule is $\bar{d}(k)=+/-1$ iff $L(d(k)|y)\geq/<0$ and the soft decisioning metric is the value of $L(d(k)|y)$.

MAP turbo decoding iterative algorithm is defined in equations (7) for a parallel architecture using the MAP log likelihood ratio $L(d(k)|y)$ in equations (6) for decoding of the encoded data bit stream estimated by QLM demodulation. This basic algorithm is used to illustrate how the decisioning metrics DM,DX are implemented, and is representative of how the DM,DX metrics are used for the more efficient algorithms such as the Log-MAP, Max-Log-MAP, iterative SOVA, and others, for parallel and serial architectures and other variations.

A representative MAP decoder parallel architecture is depicted in FIG. 3. Inputs are the detected soft output symbols 8 from the QLM demodulator which detects and recovers these symbols. This stream of output symbols consists of the outputs $\{y(k,b=1)\}$ for the systematic bit $b=1$ which is the uncoded bit, the subset of the output symbols from #1 encoder 3 in FIG. 1, and the remaining output symbols from #2 encoder 5 in FIG. 1. Systematic bits are routed to both #1 decoder 12 and #2 decoder 15. Encoded bits from #1 and #2 encoders are separately routed 9 to #1 and #2 decoders. In equations (7), step 1 defines the various parameters used in the turbo decoding iterations.

Step 2 starts iteration $i=1$ in FIG. 3 for #1 decoder 12. Extrinsic information $L_{1e}$ from this decoder 12 in FIG. 3 for $i=1$ is calculated in step 2 in equations (7) using the soft outputs $\{y(k,b=1)\}$ 10 of the received channel for the systematic bit $b=1$ which is the uncoded bit, the subset of the detected output symbols 9 which are from #1 decoder 3 in FIG. 1, and the #1 decoder likelihood ratio output $L_1$ calculated in 2,3 in equations (6). The a-priori information on $p(d(k))$ in 2,3 in equations (6) from #2 decoder 15 is not available which means $\underline{p}(d(k))=0$ corresponding to $p(d(k)=+1)=p(d(k)=-1)=\frac{1}{2}$.

MAP turbo decoding iterative algorithm     (7)
Step 1 Definitions
    $L_m = \{L(d(k) | y)), k=1, 2, ....\}$ for m=#1, #2 decoders
        = a-posteriori likelihood ratio
    $L_{me} = \{L_{me}(d(k) | y)), k=1, 2, ....\}$
        = extrinsic information from m=#1, #2 decoder
        = a-priori estimates of $\ln[p(d=+1)/p(d=-1)]$
         which defines $\underline{p}$ for the other decoder using
         equations (8) to solve for $\underline{p}$
    $\tilde{L}_{1e}$ = Interleaved $L_{1e}$
    $\tilde{L}_{2e}, \tilde{L}_2$   = De-interleaved $L_{2e}, L_2$
    $y(k, b=1)$ = y for uncoded bit $b=1$
    $\tilde{y}(k, b=1)$ = interleaved y for uncoded bit $b=1$
Step 2 Iteration $i=1$ starts the turbo decoding
    $L_{1e} = L_1 - 0 - (2/\sigma^2)\ Re[y(k, b=1)]$
    $L_{2e} = L_2 - \tilde{L}_{1e} - (2/\sigma^2)\ Re[\tilde{y}(k, b=1)]$
    where $Re(o) = Real(o)$
Step 3 For iteration $i=2, 3, ...$
    $L_{1e} = L_1 - \tilde{L}_{2e} - (2/\sigma^2)\ Re[y(k, b=1)]$
    $L_{2e} = L_2 - \tilde{L}_{1e} - (2/\sigma^2)\ Re[\tilde{y}(k, b=1)]$
Step 4 Decode after last iteration
    Decide $\hat{d}(k) = +1/-1 = 1/0$ bit value
        for $\tilde{L}_2\ (d(k)|y)\geq/>0$ for $k=1,2,...$
        where $\hat{d}(k)$ is the estimate of $d(k)$ from turbo decoding Step 2 next proceeds to #2 decoder 15. A-priori estimates for $p(d(k))$ are calculated from the extrinsic information from #1 decoder after interleaving 13 in FIG. 3 in order to align the bits with the interleaved bits 4 in FIG. 1 which are encoded by the #2 encoder 5. Calculation of the a-priori $\underline{p}$ for #1,#2 decoder using the extrinsic information from #2,#1 decoder is given in equations (8) from references [2], [4].

A-priori calculation of p in 2,3 in equations (6)

$$\begin{aligned}&\text{A-priori calculation of } \underline{p} \text{ in 2, 3 in equations (6)} \quad (8)\\ &K = [1 + \exp(\tilde{L}_{me})]\\ &\underline{p}(d(k) = -1) = -\ln(K)\\ &\underline{p}(d(k) = +1) = \tilde{L}_{me} - \ln(K)\end{aligned}$$

Inputs to the #2 decoder 15 in FIG. 3 are the detected output symbols 9 from the #2 encoder 5 in FIG. 1, the detected symbols for the systematic bits 11 after interleaving 14, and the extrinsic information from #1 decoder 12 after interleaving 13. Calculation of the extrinsic information $L_{2e}$ from #2 decoder is given in step 2 in equations (7).

Step 3 repeats step 2 with the subtraction of the de-interleaved 16 extrinsic information input $\tilde{L}_{2e}$ to #1 decoder 12 from #2 decoder 15. This $\tilde{L}_{2e}$ is used to calculate the a-priori probabilities p using equations (8) for use in the evaluation of the a-posterior likelihood ratio $L_1$ from decoder #1, and also used in the calculation of the extrinsic information $L_{1e}$ for decoder #1 in step 3 in equations (7).

Step 4 is the calculation of the estimates $\{\bar{d}(k)\}$ for the transmitted information $\{d(k)\}$ in the form of +/−1 used in the iterative algorithm to model the BPSK modulation with values +/−1 for the estimated input signal $\{\hat{d}(k)\}$ in 18 with +1 corresponding to the bit value 1 and −1 for the bit value 0. The de-interleaved 17 a-posteriori maximum likelihood ratio $\tilde{L}_2$ from #2 decoder in FIG. 3 yields these output bits 18 using the hard decisioning rule that decides 1/0 depending on whether the $\tilde{L}_2$ is $\geq 0$ or $<0$.

Convolutional decoding solves the recursive equations derived from equations (5) by replacing the summations over all possible transitions with the best transition path to each of the new trellis states. The best transition path for convolutional decoding is the best choice of s' for each forward path s'→s and the best choice of s for each backward path s→s', where best is the maximum value of the state metric for the path transitions.

For the forward and backward recursion log ML equations are derived in equations (9) using the redefined state path metrics $\alpha_k(s)$, $\beta_{k-1}(s')$ and the state transition decisioning function DM. We find

---

Forward equations for ML convolutional decoding (9)
1. The ML probability density has the well-known factorization assuming a memoryless channel
$$p(y(k) \mid s) = \Pi_{j=1,\ldots,k-1} p(y(j) \mid s_{j-1} \to s_j)$$
$$= p(y(k) \mid s' \to s)\, p(y(k-1) \mid s')$$
2. State path metric $\underline{\alpha}_k(s)$ in log format is
$$\underline{\alpha}_k(s) = \underline{p}(y(k) \mid s)$$
3. Forward equations for $\underline{\alpha}_k(s)$ are derived using 2 and the log of 1 to yield
$$\underline{\alpha}_k(s) = \max_{s'} [\underline{p}(y(k-1) \mid s') + \underline{p}(y(k) \mid s' \to s)]$$
$$= \max_{s'} [\underline{\alpha}_k(s) + DM(s \mid s')]$$
$$DM(s \mid s') = \underline{p}(y(k) \mid s' \to s)]$$
$$= -|y(k) - x(k)|^2 / 2\sigma^2$$

---

4. Backward equations for $\underline{\beta}_{k-1}(s')$ are derived
$$\underline{\beta}_{k-1}(s') = \max_s [\underline{p}(y(j>k) \mid s) + \underline{p}(s, y(k) \mid s')]$$
$$= \max_s [\underline{\beta}_k(s) + DM(s \mid s')]$$
using the definition
$$\underline{\beta}_{k-1}(s') = \ln[p(y(j>k-1), s')]$$
$$= p(y(j>k-1 \mid s')]$$

---

In step 1 the factorization of the ML probability is allowed by the memoryless channel assumption. Step 2 is the definition of the path metric $\alpha_k(s)$ in log format which is different from its definition in 1 in equations (4) for MAP turbo decoding. Step 3 derives the forward recursive equation for $\alpha_k(s)$ by combining the equations in 1 and 2 and using the definition of the ML decisioning metric $DM=\ln[p(y(k)|s'\to s)]=\underline{p}(y(k)|s'\to s)]$ for the path s'→s for convolutional decoding. Path metrics and the corresponding data d(k) bit for each trellis state are stored in a state matrix. The best path corresponding to decoding state k is used to select the best data d(k−D) bit decision at the state k−D of this path stored in the state matrix, where D is a delay in the data bit decisioning that is required for reliable decoding. In 4 the backward recursion log ML equation is derived following a similar logic starting with the definition for $\underline{\beta}_{k-1}(s')$.

Convolutional decoding forward recursive metric equations for calculation of the logarithm $\ln[\alpha_k(s)]=\underline{\alpha}_k(s)$ of $\alpha_k(s)$ are derived in 1,2,3 in equations (10) for the current ML, current MAP, and the new MAP,

---

Convolutional decoding forward equations (10)
1. Current ML decisioning metric
$$\underline{\alpha}_k(s) = \max_{s'} [\underline{\alpha}_{k-1}(s') + DM(s \mid s')]$$
2. Current MAP decisioning metric
$$\underline{\alpha}_k(s) = \max_{s'} [\underline{\alpha}_{k-1}(s') + DM(s \mid s') + \underline{p}(d)]$$
3. New MAP decisioning metric
$$\underline{\alpha}_k(s) = \max_{s'} [\underline{\alpha}_{k-1}(s') + DX(s \mid s')]$$

--- and in 1,2,3 in equations (11) for the backward recursive metric equations for calculation of the logarithm $\ln[\beta_{k-1}(s')] = \underline{\beta}_{k-1}(s')$ of $\beta_{k-1}(s')$ for the current ML, current MAP, and the new MAP. We find

---

Convolutional decoding backward equations (11)
1. Current ML decisioning metric
$$\underline{\beta}_{k-1}(s') = \max_s [\underline{\beta}_k(s) + DM(s \mid s')]$$
2. Current MAP decisioning metric
$$\underline{\beta}_{k-1}(s') = \max_s [\underline{\beta}_k(s) + DM(s \mid s') + \underline{p}(d)]$$
3. New MAP decisioning metric
$$\underline{\beta}_{k-1}(s') = \max_s [\underline{\beta}_k(s) + DX(s \mid s')]$$

--- wherein it should be noted that the new log MAP equations are the correct formulation from a probabilistic theoretic viewpoint and offer promise for improved decisioning metric performance as demonstrated in U.S. Pat. No. 7,337,383 B1.

SUMMARY OF THE INVENTION

A quadrature layered modulation QLM waveform supports an increase "$n_p \geq 1$" in the data rate for all communications links by implementing the data symbol rate increase using a differentiating parameter comprising the correlation function of the QLM waveform wherein "$n_p$" is the ratio of data symbol rate with QLM compared to the existing data symbol rate. The correlation function of a differentiating parameter provides a method to recover the transmitted data symbols using a trellis demodulation algorithm or the equivalent. Ideal QLM is used to derive a bound on the communications capacity to replace the Shannon bound to allow higher data rates. QLM performance overlayed on existing data symbol modulations closely approximate this bound. Matlab simulations validate demodulation performance. QLM demodulation algorithms are trellis symbol and trellis bit algorithms in iterative and reduced-state architectures. These algorithms are combined with representative hard decisioning and soft decisioning error correction decoding algorithms including MAP decoding, convolutional decoding, and Turbo decoding algorithms using current maximum likelihood ML decisioning metrics as well as the new maximum a-posteriori decisioning metrics and algorithms in the recent U.S. Pat. No. 7,337,383 B1.

BRIEF DESCRIPTION OF THE SEVERAL VIEWS OF THE DRAWINGS

The above-mentioned and other features, objects, design algorithms, and performance advantages of the present invention will become more apparent from the detailed description set forth below when taken in conjunction with the drawings and performance data wherein like reference characters and numerals denote like elements, and in which:

FIG. 1 is a representative block diagram of the implementation of a turbo encoder using a parallel architecture.

FIG. 2 is a representative block diagram of the implementation of a turbo decoder using a parallel architecture.

FIG. 3 calculates the performance of QLM PSK and QLM QAM as Bps/Hz=Bits/(symbol Interval)=b vs. $E_b/N_o$.

FIG. 4 calculates the performance of QLM PSK and QLM QAM as Bps/Hz=Bits/(symbol Interval)=b vs. S/N=C/I.

FIG. 5 plots the ideal waveform in time and frequency, the correlation function of the waveform, and a QLM correlation function for $n_p=4$.

FIG. 6 plots a OFDMA Wavelet waveform in time, the Wavelet correlation function in time, and the ideal correlation function in time.

FIG. 7 plots a OFDMA DFT waveform in frequency, the DFT correlation function in frequency, and the ideal correlation function in frequency wherein DFT is the discrete fourier transform.

FIG. 8 illustrates the pulse waveform time offsets for QLM with $n_p$ layers of communications.

FIG. 9A is a block diagram of a trellis symbol demodulation algorithm.

FIG. 9B is the flow diagram of the trellis symbol demodulation algorithm.

FIG. 9C is the continuation of the flow diagram of the trellis symbol demodulation algorithm.

FIG. 10 plots the measured bit error rate BER performance for the uncoded 4-PSK QLM with a $n_p=2$ layered QLM pulse waveform in FIG. 8 using the trellis demodulation algorithm in FIG. 9.

FIG. 11 is a block diagram of a QLM trellis symbol iterative demodulation algorithm.

FIG. 12 plots complexity metric performance of a trellis symbol demodulation algorithm vs. the information bits b.

FIG. 13 plots complexity metric performance of a trellis bit demodulation algorithm vs. the information bits b.

FIG. 14 illustrates decisioning manifolds for 8-PSK for the first two bits of the 3 bit 8-PSK data symbol.

FIG. 15 is a block diagram of a QLM trellis bit demodulation algorithm.

FIG. 16 is a block diagram of a QLM trellis bit iterative algorithm.

FIG. 17A is an implementatin for recording soft decisioning decoding metrics in the QLM trellis demodulation algorithm in FIG. 9.

FIG. 17B continues recording of decoding metrics.

FIG. 17C continues recording of decoding metrics.

FIG. 17D continues recording of decoding metrics.

FIG. 18 are block diagrams of representative QLM hard and soft decisioning QLM decoding architectures.

FIG. 19 is a representative transmitter implementation block diagram for OFDMA QLM.

FIG. 20 is a representative transmitter implementation block diagram for CDMA QLM.

FIG. 21 is a representative transmitter implementation block diagram for OWDMA QLM.

FIG. 22 is a representative receiver implementation block diagram for OFDMA QLM.

FIG. 23 is a representative receiver implementation block diagram for CDMA QLM.

FIG. 24 is a representative receiver implementation block diagram for OWDMA QLM.

DETAILED DESCRIPTION OF THE INVENTION

Quadrature layered modulation QLM allows the data rate supported by a channel to be increased above the Nyquist rate by orders-of-magnitude by transmitting the data at a faster rate or equivalently by adding layers of independent communications channels or signals over the existing communications such that each layer can be uniquely separated and demodulated in the receiver. These layers of communications channels are parallel sets of communications channels occupying the same bandwidth B as the $1^{st}$ layer which is the original set of communications channels occupying the bandwidth B. Layering of parallel channels or signals is not necessarily an addition of signals in the algebra of the real or complex field since for example for GMSK the layering is in the frequency domain of the FM signal. Increasing the data rate generates a correlated response between consecutive data symbols which correlation function is a discriminanting paramenter that enables the data symbols to be separated and demodulated in a receiver.

The new bound on communications capacity recognizes that the Nyquist rate $1/T_s = B$ assumed in the Shannon bound in equations (1) can be increased to $n_p/T_s = n_p B = n_p x$ (Nyquist Rate) with $n_p$ layers of the communications or equivalently with the addition of $(n_p - 1)$ parallel communications channels with differing characteristics which make them separable and recoverable in the receiver with implementation of a trellis type demodulation algorithm or the equivalent in terms of capabilities and performance where "equivalent" includes the plurality of all possible mathematical techniques to provide alternative solutions compared to the broad class of trellis algorithms. Note that "x" is the multiplication symbol for "times". In this patent disclosure the term "separable" is intended to mean there is a differentiating parameter or equivalently a discriminating parameter which allows the $n_p$ layers or equivalently channels to be uniquely recoverable.

The capacity bound and coding theorem in equations (15) are derived for convenience using time as the differentiating parameter without placing any restriction on the choice of a differentiating parameter(s) to be used in an application. Step 1 in the derivation observes a suitably constructed trellis algorithm will successfully invert the transmitted layers $1, \ldots n_p$ of communications channels for QLM to recover estimates of the transmitted symbols when the layers are time synchronized for transmission at $T_s/n_p$, $2T_s/n_p$, ..., $(n_p-1) T_s/n_p$ offsets respectively for layers $2, 3, \ldots, (n_p-1)$ relative to the $1^{st}$ layer at zero offset corresponding to transmitting symbols at $\Delta T_s$ intervals with $\Delta T_s = T_s/n_p$. In 1 in equations (12) the maximum capacity "$\max\{b_p\}$" of "b" for each layer designated as "$b_p$" using the subscript "p" to indicate the "layers", is equal to the Shannon bound in 2 in equations (1) upon using "$(S/N)_p$" to indicate the (S/N) for each layer. This enables one to calculate in 2 in equations (12) the total capacity "b" equal to the addition of the capacity for each of the $n_p$ layers or equivalently as the product of "$n_p$" times the Shannon capacity in 2 in equations (1). We find Step 1

1 $\max\{b_p\} = \log_2[1+(S/N)_p]$

2 $b = n_p \log_2[1+(S/N)_p]$ \hfill (12)

where $b = n_p b_p$ = Bps/Hz = Bits/(Symbol Interval) is the number of bits over a $T_s$ interval, $(S/N)_p$ = S/N per symbol which is available for demodulation in each of the parallel-layered communications sets of channels, and the maximum label for b has been removed since there is a dependency on both $n_p$ and $(S/N)_p$ which must be defined in order to transform this equation into a maximum for b.

Step 2 derives the expression for the total (S/N) in 2 in equations (13) as a function of the $(S/N)_p$ by observing that the communications layers will equally share in the S/N and the $(S/N)_p$ available for demodulation in each layer is equal to the signal power in each layer over the separation interval $\Delta T_s$. For demodulation, each layer receives the signal power over the fraction $\Delta T_s = T_s/n_p$ of the symbol interval $T_s$ which means $n_p(S/N)_p$ is equal to the signal to noise ratio $(S/N)/n_p$ over $T_s$ for each layer as defined in 1 and reorganized as 2 in equations (13).

Step 2

1 $n_p(S/N)_p = (S/N)/n_p$

2 $S/N = (n_p{}^2)(S/N)_p$ \hfill (13)

This scaling law is used to derive the $E_b/N_o$ from the value $(E_b/N_o)_p$ available for demodulation in each layer. Substituting the identities $S/N = bE_b/N_o$, $(S/N)_p = b_p(E_b/N_o)_p$, and $b = n_p b_p$ into 2 in equations (13) yields equation (14).

$E_b/N_o = n_p(E_b/N_o)_p$ \hfill (14)

The scaling laws in equations (13), (14) state that at constant bandwidth, a data rate increase by the factor $n_p$ requires the (S/N), $E_b/N_o$ to be increased by the factor $n_p{}^2$, $n_p$ respectively in order to keep the same performance metrics such as the bit-error-rate BER performance metric.

Equations (12) and (13) for step 1 and step 2 respectively can be combined with the identity $S/N = bE_b/N_o$ to yield the equations (15) for the new bounds on C, $\max\{b\}$, and $\max\{\eta\}$ as a function of S/N, $E_b/N_o$ and for the minimum $E_b/N_o$ written as $\min\{E_b/N_o\}$ as a function of b wherein the optimization is over the number of communications layers $n_p$.

Upper bounds for b and $\eta$ defined in 2 in equations (15) are derived from 2 in equations (12), 2 in equations (13), and the identities $S/N = bE_b/N_o$ and $\max\{\eta\} = \max\{b\}$ in the form of a maximum with respect to the selection of the parameter $n_p$ for fixed values of S/N in the first expression and in the second for fixed values of $E_b/N_o$ with an interactive evaluation of b from the first expression.

Upper bound for C in 1 in equations (15) is derived from the capacity equation for $\max\{b\}$ in 2 in equations (12) and the identities $b = C/B$ and $S/N = bE_b/N_o$ in the form of an upper bound on C with respect to the selection of the parameter $n_p$ for fixed values of S/N in the first expression and in the second for fixed values of $E_b/N_o$ with an interactive evaluation of b from 2.

Lower bound on $E_b/N_o$ which is the minimum value $\min\{E_b/N_o\}$ in 3 in equations (15) is derived by solving the second expression in 2 and taking the minimum over all allowable values of $n_p$.

The new coding theorem in 4 in equations (15) states that C is the upper bound on the information data rate $R_b$ in bits/second for which error correcting codes exist to provide reliable communications with an arbitrarily low bit error rate BER where C is defined in 1 in equations (15) and upgrades the Shannon coding theorem 3 in equations (1) using new capacity bound C in 1 in equations (15) and introduces the new data symbol rate 5 whose maximum value $\max\{n_p/T_s\}$ is $n_p$ times the Nyquist rate for a bandwidth B.

New capacity bounds and coding theorm \hfill (15)

1 $\quad C = \max\{n_p B \log_2[1 + (S/N)/n_p{}^2]\}$ $\quad = \max\{n_p B \log_2[1 + (b\, E_b/N_o)/n_p{}^2]\}$ 2 $\quad \max\{b\} = \max\{n_p \log_2[1+(S/N)/n_p{}^2]\}$ $\quad = \max\{n_p \log_2[1+(b\, E_b/N_o)/n_p{}^2]\}$ $\quad = \max\{\eta\}$ 3 $\quad \min\{E_b/N_o\} = \min\{[n_p\hat{\,}2/b][2\hat{\,}b]/n_p - 1]\}$ 4. New coding theorem For $R_b < C$ there exists codes which support reliable communications For $R_b > C$ there are no codes which support reliable communications 5. New symbol rate $n_p/T_s$ $\quad \max\{n_p/T_s\} = n_p B$ for $n_p$ layers of communications $\quad = n_p \times$ (Nyquist rate)

FIG. 3,4 calculate the Shannon bound 23,36, new bound 24,30, quadrature amplitude QAM and phase shift keying PSK turbo coded performance, and some of the available QLM options for supporting b=Bps/Hz=bits/($T_s$ symbol interval) performance to 12 Bps/Hz using the scaling laws for $E_b/N_o = n_p(E_b/N_o)_p$ in equations (14) and the scaling laws for $S/N = (n_p{}^2)(S/N)_p$ in equations (13) to calculate the QLM PSK and QLM QAM performance for $n_p > 1$ for 4-PSK, 8-PSk, 16-QAM, 64-QAM, 256-QAM modulations. The new bound is from equations (14),(15) and the Shannon bound from equations (1).

Turbo coded PSK 25.26.31.32 and turbo coded QAM 27-29,33-35 performance plot the number of information bits per symbol b versus measured S/N and $E_b/N_o$ for 4-PSK, 8-PSK, 16-QAM, 64-QAM, 256-QAM, 4096-QAM. The 4-PSK, 8-PSK are 4-phase, 8-phase phase shift keying modulations which respectively encode 2,3 bits per symbol and 16-QAM, 64-QAM, 256-QAM, 1024-QAM are 16, 64, 256, 4096 state QAM modulations which respectively encode 4,6, 8,12 bits. For no coding the information bits per symbol b is equal to the modulation bits per symbol $b_s$ so that $b = b_s = 2,3, 4,6,8,12$ bits per symbol respectively for 4-PSK, 8-PSK, 16-QAM, 64-QAM, 256-QAM, 4096-QAM. Turbo coding performance assumes a modest 4 state recursive systematic convolutional code RSC, 1024 bit interleaver, and 4 turbo decoding iterations. The assumed coding rates R=3/4, 2/3, 3/4, 2/3, 3/4, 2/3 reduce the information bits per symbol to the respective values b=1.5,2,3,4,6,8 bits. Performance data is from C. Heegard and S.B. Wicker's book "Turbo Coding", Kluwer Academic Publishers 1999, B. Vucetic and J. Yuan's book "Turbo Codes", Kluwer Academic Publishers 2000, J. G. Proakis's book "Digital Communications", McGraw Hill, Inc. 1995, and L. Hanzo, C. H. Wong, M. S. Lee's book "Adaptive Wireless Transceivers", John Wiley & Sons 2002.

FIG. 3,4 calculate coded QLM performance for QLM PSK (which reads "QLM modulation using PSK data symbol modulation") and QLM QAM using the scaling laws for $E_b/N_o = n_p(E_b/N_o)_p$ in equations (14) and for $S/N = (n_p{}^2)(S/N)_p$ in 2 in equations (13). FIG. 3 calculates the QLM 4-PSK b vs. $E_b/N_o$ in 25 for $n_p$=2,4,8, the QLM 8-PSK b vs. $E_b/N_o$ in 26 for $n_p$=2, 4, 6 in 26, and the QLM 16-QAM, 64-QAM, 256-QAM b vs. $E_b/N_o$ for $n_p$=2,4, $n_p$=2,3, $n_p$=2, respectively in 27, 28, 29. FIG. 4 calculates the QLM b vs. S/N=C/I for 4-PSK in 31, 8-PSK in 32, 16-QAM in 33, 64-QAM in 34, and 256-QAM in 35.

Demodulation algorithms for QLM implement the steps in the signal processing (16):

---
QLM Demodulation Signal Processing (16)
step 1 detects the received QLM signal to remove the waveform and recover the stream of correlated transmitted data symbols at the rate $n_p/T_s = n_pB$ data symbols per second,
step 2 processes this stream of correlated data symbols to recover estimates of the data symbols for each of the $n_p$ communication channels or sets of channels or layers, and
step 3 converts the data symbol stream for each channel or each set of channels to a data bit stream and implements error correction decoding of the data bit stream to recover estimates of the transmitted data bits.
---

In step 2 the ability of the demodulation algorithms to recover the transmitted data symbols from the received QLM communications signal depends on the correlation (auto-correlation) function being well-behaved. A correlation function of a discriminating parameter or equivalently a differentiating parameter such as time offset or frequency offset enables the QLM layers to be demodulated to recover the transmitted data symbols. Plots of representative correlation functions in time and frequency offsets are given in FIGS. 5, 6, 7. The correlations in FIGS. 5, 6, 7 are used to implement step 2 of the demodulation signal processing (16) since their symmetry property makes these correlations equal to convolutions of the waveforms with their stored replicas which is a requirement in step 2 of the demodulation signal processing (16).

FIG. 5 presents an ideal impulse response waveform (pulse waveform) in both time and frequency and the corresponding correlation in time and frequency. In time 12 the ideal impulse response 10 waveform 11 extends over the data symbol $T_s$ second interval 13 and has a correlation function 14 in time 15 with a triangular mainlobe 16 extending over $2T_s$ seconds 18 with zero sidelobes 17. This waveform is the ideal pulse waveform in FIG. 8. In frequency 12 the ideal impulse response 10 waveform 11 extends over the frequency interval B Hz 13 and has a correlation function 14 in frequency 15 with a triangular mainlobe 16 extending over 2B Hz 18 with zero sidelobes 17. The correlation function for the pulse waveform in FIG. 8 for $n_p$=4 is overlayed on the triangular correlation function as a set of circles 19 on the mainlobe and on the sidelobes 17. It is observed there are $2n_p-1=2\times4-1=7$ correlation values in the mainlobe.

FIG. 6 presents a Wavelet waveform in patent application Ser. No. 09/826,118 for OWDMA in time, the correlation function, and an ideal correlation function in time. The correlation function closely approximates the waveform and the ideal triangular correlation closely approximates the mainlobe and has a mainlobe 20 extending over $2T_s$ second interval with low sidelobes 21.

FIG. 7 presents a N=64 point discrete fourier transform DFT for OFDMA in frequency, the correlation function, and an ideal correlation function in frequency. The correlation function closely approximates the waveform and the ideal triangular correlation closely approximates the mainlobe and has a mainlobe 22 extending over $2B=2/T_s$ Hz interval with low sidelobes 23 wherein the symbol rate $1/T_s$ is at the Nyquist rate and equal to the bandwidth B for each channel.

FIG. 8 defines the QLM modulation for an ideal pulse modulation with timing offset as the differentiating parameter between the QLM layers and whose waveform and correlation function are defined in FIG. 5. The reference pulse 33 $p_i=p_i(t)$ defined over time 34 t is 35 $T_s$ seconds long and normalized with amplitude 36 $1/T_s$. Starting time 37 is $t=i_1 T_s$ and ending time 38 is $T_s$ seconds later. Indexing convention is a pulse i has no offset relative to the reference time, pulse i+1 41 has a $\Delta T_s$ offset 37, pulse i-1 43 has a $-\Delta T_s$ offset 37, and this convention applies to all i. Symbol modulation 39 $Ae^{(j\phi_i)}$ when multiplied by the pulse amplitude 36 $1/\sqrt{T_s}$ is the complex envelope of the pulse waveform. Consecutive pulses are spaced at 40 $\Delta T_s = T_s/n_p$ second intervals. Also shown are the consecutive later pulse 41 and the continuation 42, and the earlier pulses 43 and 44 and the continuation 45. Starting times for these additional pulses are given in 37. This QLM architecture has a pulse overlap of nearest neighbor pulses with a corresponding correlation between these pulses given in FIG. 5 for $n_p$=4 pulses or layers.

Step 2 demodulation algorithms are grouped into maximum likelihood ML symbol algorithms, trellis symbol algorithms, and trellis bit algorithms. Trellis symbol algorithms are trellis algorithms over the correlated data symbol fields and use ML, maximum a-posteriori MAP, or other decisioning metrics. Trellis bit algorithms are trellis algorithms over the data symbol correlated bit fields. MAP decisioning metrics have been introduced in the recent U.S. Pat. No. 7,337,383 B1 for trellis and convolutional decoding using trellis algorithms. This classification of demodulation algorithms is introduced to illustrate representative methods for constructing demodulation algorithms and is not a limitation on the scope of this invention which encompasses all possible demodulation algorithms for QLM.

For step 2 consider a trellis symbol algorithm in FIG. 9 using a ML decisioning metric or a MAP decisioning metric disclosed in the recent U.S. Pat. No. 7,337,383 B1 or another decisioning metric. FIG. 9A is the top level block diagram of the trellis algorithm for a non-iterative application. Basic elements of the algorithm are the trellis parameters 170, trellis algorithm 171 structured by the parameter set in 170, and the trellis decoding algorithm 172. The trellis algorithm completes or partially completes trellis demodulation before handing off the data symbol estimates and metrics to the trellis decoding algorithm 172 or alternatively, interleaves the trellis error correction decoding 172 with trellis demodulation by accepting one or more data symbol estimates from the trellis algorithm for decoding before returning 173 to the trellis algorithm for processing the next data symbols. Decoding data estimates 174 are handed off to the receiver for further processing. The parameter set 170 is applicable to the ideal pulse modulation defined in FIG. 5,8 with time as the differentiating parameter as well as to the pulse waveforms in FIG. 6,7 and to other applications with other differentiating parameters. The correlation function in FIG. 5 for the pulse waveform in FIG. 8 has zero sidelobes which means only the mainlobe correlation has to be considered in the trellis algorithm. Mainlobe correlation values for $n_p=4$ are plotted in FIG. 5. It is sufficient to use a one-sided correlation function since the correlation is symmetrical about the origin whereupon the correlation vector C whose elements are the mainlobe correlation coefficients is observed to be equal to C=[c(0),c(1),c(2),c(3)]=[1,3/4,1/2,1/4] for $n_p=4$ where the correlation coefficients are c(0),c(1),c(2),c(3). Other trellis parameters are the number of data symbols n, number of parallel QLM channels $n_p$, number of data symbol states $n_s$, and the number of trellis states $n_t=n_s\hat{}(2n_p-2)=2\hat{}b_s(2n_p-2)$ wherein $n_s=2\hat{}b_s=4, 8, 16, 64, 356$ for 4-PSK,8-PSK, 16-QAM, 64-QAM, 256-QAM for the correlation function in FIG. 5.

FIG. 9B uses the trellis parameters 170 in the initialization 150 prior to the start k=0 with an empty shift register SR which normally contains the $2n_p-1$ Rx correlated data symbols for the mainlobe plus the correlated symbols for the sidelobes for each of the possible trellis paths. At k=0 the path metric $\alpha_0(xi)$ is set equal to a negative or zero initialization constant for all of the nodes xi=0, 1, 2, . . . , $(n_s\hat{}(2\ np-2)-1\}$ of the trellis diagram where $\alpha_0(xi)$ is the logarithm of the state $S_0$ path metric at k=0 for node xi, $n_s$ is the number of states of the data symbol modulation, the Rx symbols are indexed over k with k=0 indicating the initial value prior to the Rx symbol k=1, nodes of the trellis diagram are the states of the SR, and state $S_k$ refers to the trellis diagram paths and metrics at symbol k in the trellis algorithm. In the previous for ML block decoding the symbols were indexed over i.

Loop 151 processes the Rx symbols k=1, 2, . . . , n where the index k also refers to the corresponding algorithm steps and to the states of the trellis algorithm. In 152 the Rx signals are pulse detected to remove the carrier frequency and waveform to recover a normalized correlated data symbol $Y_k$. For each Rx symbol $Y_k$ the state transition decisioning metrics $R_k(jxi)$ are calculated by the logarithm transition metric equations $\{R_k(jxi)=-|Y_k-\hat{X}(jxi)|\hat{}2\}$ for a ML metric, $\{R_k(jxi)=|\hat{X}_k|\hat{}2-2Real(Y_k\hat{X}(jxi)^*)\}$ for a MAP metric wherein (o)* is the complex conjugate of (o), and $\{R_k(jxi)=\text{metric}(Y_k, \hat{X}_k)\}$ for another metric, for all possible transition paths $\{jxi\}$ from the previous state $S_{k-1}(xi)$ at node xi to the new state $s_k(jx)$ at node jx in the trellis diagram snd where $\hat{X}_k(jxi)$ is the hypothesized normalized detected correlated symbol k for the path jxi. For a mainlobe correlation function the $\hat{X}_k(jxi)$ is defined by the equation $\hat{X}_k(jxi)=c(n_p-1)[sr(1)+sr(2n_p-1)]+\ldots+c(1)[sr(n_p-1)+sr(n_p+1)]+c(0)[sr(n_p)]$ which calculates $\hat{X}_k(jxi)$ as the correlated weighted sum of the elements of the shift register SR=[sr(1), sr(2), . . . , sr($2n_p-1$)]' with $\hat{Z}_k=sr(n_p)$, $\hat{Z}_{k-1}=sr(n_p-1)$, $\hat{Z}_{k+1}=sr(n_p+1)$, . . . where c(0)=1, the normalized data symbol estimates $\{\hat{Z}_k\}$ correspond to the transition index jxi, and the state k estimated symbol $\hat{Z}_k$ is the SR center element sr($n_p$) with correlation coefficient c(0)=1. Symbols move from left to right starting with "j" with each new received symbol or step in the trellis recursion algorithm, and ending with "i". With this convention "j" is indexed over the states of sr(1), "x" is indexed over the current states of sr(2), . . . , sr($2n_p-2$), and "i" is indexed over the states of sr($2n_p-1$). Index the paths of the trellis diagram is defined by the equation jxi=sr(1)+$n_s$ sr(2)+$n_s\hat{}2$ sr(3)+ . . . +$n_s\hat{}(2n_p-2)$ sr($2n_p-1$)=0, 1, 2, . . . , $n_s\hat{}(2n_p-1)-1$ when the contents of the SR elements are the indices corresponding to the assumed data symbol state values.

Loop 153 calculates the best trellis transition paths from state $S_{k-1}$ to the new state $S_k$ for the new nodes jx=0, 1, 2, . . . , $n_s\hat{}(2n_p-2)-1$. In 154 the path metric $\alpha_k(S_k)$ is defined by the recursive logarithm equation $\alpha_k(S_k)=\alpha_{k-1}(S_{k-1})+R(S_{k-1}->S_k)$ which can be rewritten as $\alpha_k(jx)=\alpha_{k-1}(xi)+R(jxi)$ since the state $S_k$ corresponds to node jx, state $S_{k-1}$ corresponds to node xi and the state transition from $S_{k-1}$ to $S_k$ represented symbolically as $S_{k-1}->S_k$ corresponds to the path jxi.

The best path metric $\alpha_k(jx)$ for each new node jx is chosen by the decisioning equation $\alpha_k(jx)=\text{maximum}\{\alpha_{k-1}(xi)+R_k(jxi)\}$ with respect to the admissible xi. For each jx, the corresponding xi yielding the highest value of the path metric $\alpha_k(jx)$ is used to define the new symbol $\hat{Z}_k$ and path.

For k≧D the state metric $S_k$ is upgraded for this new path jxi by the update operation $S_k(:,jx)=[\hat{Z}_k(jxi); S_{k-1}(1:D-1, xi)]$ using Matlab notation which replaces the column jx vector with the column xi vector after the elements of xi have been moved down by one symbol and the new symbol $\hat{Z}_k$ added to the top of the column vector which is the row 1 element. State $S_k$ is a D by ($n_\phi\hat{}(2n_p-2)$) matrix with the column vectors equal to the trellis states over the past D symbols where "D" is the trellis decoding memory extending over several correlation lengths ($2n_p-1$) for the solution to be stabilized. In Matlab notation the $S_k(:,jx)$ is the column vector jx of $S_k$ consisting of the new symbol $\hat{Z}_k$ and the previous D-1 symbols along the trellis path to node jx and the $S_{k-1}(1:D,xi)$ is the Dx1 column vector of $S_{k-1}$ for the previous node xi.

For k≦D the state metric $S_k$ is upgraded for this new path jxi by the operation $S_k(:,jx)=[\hat{Z}_k(jxi); S_{k-1}(:,xi)]$ which replaces the column jx vector with the column xi vector after the new symbol $\hat{Z}_k$ has been added to the top of the column which is the row 1 element to increase the path size by one. State $S_k$ is a k by ($n_\phi\hat{}(2n_p-2)$) matrix with the column vectors equal to the trellis states over the past k symbols.

Metric values for each path in $S_k$ are stored for later use in soft decisioning turbo and convolutional decoding. Metrics of interest for each symbol k and for each jx are the values of $\{\alpha_{k-1}(xi)+R(jxi)\}$ for all admissible xi states for the new path symbol $\hat{Z}_k$ for jx for k.

For symbols k≧D the best path jx is found which maximizes $\alpha_k(jx)$ and the estimated value $\hat{Z}_{k-D}$ for symbol k-D is the last row element of the column corresponding to this best path in state metric $S_k$. This continues until k=n and ends the k loop 151. The jx loop 153 has been ended prior to finding the best path in $S_k$.

Processing 162 continues with steps k=n+1, . . . , n+D-1 160, 161 to recover the estimated values $\hat{Z}_{k-D}$ of the Tx symbols $Z_k$ which are read from the corresponding row elements D-1, D-2, . . . , 1 of the column in the state metric $S_n$ corresponding to the best path jx found for the last symbol k=n. This ends the jx loop 161.

Outputs 164 of the trellis algorithm used for trellis decoding are the estimates $\{\hat{Z}_k\}$ of the transmitted symbols $\{Z_k\}$ and the corresponding metric values for all admissible states for each new path symbol $\hat{Z}_k$ for all k. Trellis error correction turbo or convolutional decoding 165 recovers data estimates and hands off the data estimates 166 to the receiver for further processing.

The trellis algorithm for QLM example FIG. 9 using partial symbol $\Delta T_s$ integration presents another approach to a trellis algorithm for symbol recovery which offers a potential reduction in computational complexity compared to the algorithm for full symbol $T_s$ integration in the trellis algorithm in FIG. 9.

The largest computational burden is the calculation of the metrics, paths, and states. For the trellis algorithm in FIG. 9 the number of calculations is essentially determined by the number $n_s\hat{}(2n_p-2)$ of nodes in the trellis algorithm. For the $\Delta T_s$ integration in the trellis algorithm the number of nodes reduces to a significantly lower number $n_s\hat{}(n_p-1)$. For this invention disclosure it is sufficient to demonstrate the trellis algorithm defined in FIG. 9.

FIG. 10 measures the trellis decoding performance for uncoded 4-PSK $n_p=1$ and for $n_p=2$ layers of QLM modulation implementing the decoding algorithm FIG. 9. Performance is plotted as bit error rate BER versus the normalized value $(E_b/N_o)/n_p$ of the $E_b/N_o$ for the new bound from equation (4). Normalization means that for a given BER the $(E_b/N_o)/n_p$ has the same value for all $n_p$. For example, this means that BER=0.001 requires $(E_b/N_o)/n_p=6.8$ dB and for $n_p=1,2,4$ this requires $E_b/N_o=6.8+0=6.8$, $6.8+3=9.8$, $6.8+6=12.8$ dB respectively. Measured performance values for $n_p=2$ are from a direct error count Monte Carlo simulation of the trellis algorithm and are plotted in FIG. 10 as discrete measurement points.

For step 2 consider an iterative trellis symbol algorithm in FIG. 11. The correlation function observed in FIG. 6, 7 for OWFMA, OFDMA waveforms have sidelobes which cause a degradation in BER performance unless they are incorporated into the trellis algorithm. A method for reducing this loss of BER performance without increasing the number of trellis states is to use an iterative algorithm which calculates the estimated data symbols in the first iteration using part or all of the mainlobe correlation function, uses these estimates to fill in the contributions of the sidelobes in the calculation of the estimated data symbols in the second iteration of the trellis algorithm, and continues this iteration if necessary.

FIG. 11 is a flow diagram of an interative trellis symbol algorithm wherein the iteration is used to incorporate the effects of the sidelobes of the correlation function into the trellis state transition metric function $R_k(jxi)$ in 152 in FIG. 9B in the non-iterative trellis symbol algorithm with a relatively small increase in computational complexity. In FIG. 9 the algorithm is initialized with the parameter set in 176 which is the parameter set in 170 in FIG. 9A with the partitioning of the correlation vector C into the mainlobe vector $C_0$ plus the sidelobe vector $C_1$ and adding the specification of the stopping rule for the iterations. For a correlation vector $C=[c(0),c(1), \ldots, c(n_p-1),c(n_p), \ldots, c(n_c)]$ consisting of $n_c$ correlation coefficients, the mainlobe vector is $C_0=[c(0), c(1), \ldots, c(n_p-1),0,0,\ldots,0]$ and the sidelobe vector is $C_1=[0, 0, \ldots, 0,c(n_p), \ldots, c(n_c)]$ which partitions C into the vector sum $C=C_0+C_1$.

The iterative algorithm starts 177 by implementing the trellis algorithm 171 in FIG. 9A for the correlation mainlobe using the non-zero $C_0$ coefficients. Output data symbol estimates are used to calculate the a-priori estimated sidelobe contribution $\hat{X}_{k|1}$ in 179 to $\hat{X}_k(jxi)$ which is the hypothesized normalized detected correlated symbol k for the path jxi in the calculation of the metric $R_k(jxi)$ in 152 in FIG. 9B. In this implementation 180 of the trellis algorithm 152,154 in FIG. 9B, the $\hat{X}_k(jxi) = \hat{X}_{k|0}(jxi) + \hat{X}_{k|1}$ is the sum of the hypothesized mainlobe contribution $\hat{X}_{k|0}(jxi)$ using the non-zero $C_0$ coefficients as described in FIG. 9 and the sidelobe contribution $\hat{X}_{k|1}$ using the data symbol estimates from 177 and the non-zero $C_1$ coefficients and wherein the subscripts "k|0" reads "index k given $C_0$" and "k|1" reads "index k given $C_1$". From 152 in FIG. 9B we find the $\hat{X}_{k|0}(jxi)$ is defined by the equation $\hat{X}_{k|0}(jxi) = c(n_p-1)[sr(1)+sr(2n_p-1)] + \ldots + c(1)[sr(n_p-1)+sr(n_p+1)] + c(0)[sr(n_p)]$ which calculates $\hat{X}_{k|0}(jxi) = \hat{X}_k(jxi)$ in FIG. 9B as the correlated weighted sum of the elements of the shift register $SR=[sr(1),sr(2), \ldots, sr(2n_p-1)]'$ with $\hat{Z}_k=sr(n_p)$, $\hat{Z}_{k-1}=sr(n_p-1)$, $\hat{Z}_{k+1}=sr(n_p+1), \ldots$ where $c(0)=1$, the normalized data symbol estimates $\{\hat{Z}_k\}$ correspond to the transition index jxi, and the state k estimated symbol $\hat{Z}_k$ is the SR center element $sr(n_p)$ with correlation coefficient $c(0)=1$. Symbols move from left to right starting with "j" with each new received symbol or step in the trellis recursion algorithm, and ending with "i". With this convention "j" is indexed over the states of $sr(1)$, "x" is indexed over the current states of $sr(2), \ldots, sr(2n_p-2)$, and "i" is indexed over the states of $sr(2n_p-1)$. Index over the paths of the trellis diagram is defined by the equation $jxi = sr(1) + n_s\ sr(2) + n_s\hat{}2\ sr(3) + \ldots + n_s\hat{}(2n_p-2)\ sr(2n_p-1) - 1 = 0, 1, 2, \ldots, n_s\hat{}(2n_p-1)-1$ when the contents of the SR elements are the indices corresponding to the assumed data symbol state values. The sidelobe contribution is equal to $\hat{X}_{k|1} = c(n_p)(\hat{Z}_{k-n_p} + \hat{Z}_{k+n_p}) + c(n_p+1)(\hat{Z}_{k-1-n_p} + \hat{Z}_{k+1+n_p}) + c(n_p+2)(\hat{Z}_{k-2-n_p} + \hat{Z}_{k+2+n_p}) + \ldots$ until the end of the sidelobe correlation coefficients or the end of the data symbol estimates and wherein $\hat{Z}_{k-n_p}$ is the data symbol estimate in 179 for symbol $k-n_p$.

Output of this modified trellis algorithm 180 is the set of data symbol estimates. A stopping rule in 176 is used to decide 182 if another iteration is required. When another iteration is required the data symbol estimates are used 184 to update the calculation 179 of the a-priori contribution $\hat{X}_{k|1}$ of the sidelobes to the $\hat{X}_k(jxi)$ in the modified trellis algorithm 180. With no further iteration the trellis error correction decoding 183 implements the trellis error correction decoding 172 in FIG. 9A, hands off the data estimates 186 to the receiver for further processing. and returns 185 to the trellis algorithm for processing the next data symbol or symbols when the trellis error correction decoding 183 is interleaved with the trellis demodulation. Alternatively, the trellis demodulation is completed or partially completed before handing off the data symbol estimates and metrics to the trellis decoding algorithm 183.

For step 2 a method to reduce the number of trellis states is to use a sequential trellis bit algorithm. With this method the data symbol bits are individually estimated by a trellis algorithm over the correlation function using the corresponding bits of each data symbol for each trellis pass. A comparison of the number of trellis states $n_t$ for the symbol and bit algorithms is given in 1,2 in equations (17). This number $n_t$ of trellis states is required to support each step k of the trellis demodulation and there are $n_p$ demodulation steps in each data symbol interval $T_s$ which means the number of trellis states per $T_s$ second interval is equal to $n_p n_t$. The number of trellis states requires a SR length $2n_p-2$ and is equal to $n_s\hat{}(2n_p-2)$ whereas the number of trellis paths requires a SR length $2n_p-1$ and is equal to $n_s\hat{}(2n_p-1)$. The computational complexity of a trellis algorithm is driven by the number of trellis states.

Number of trellis states $n_t$ (17)

1 Trellis symbol algorithm trellis states $$n_t = n_s\hat{}(2n_p-2)$$
$$= 2\hat{}b_s(2n_p-2)$$

2. Trellis bit algorithm trellis states $$n_t = b_s\ 2\hat{}(2n_p-2)$$

FIG. 12,13 calculate the number of trellis states $n_t$ for the information bits b per data symbol interval for values to b=12 Bits/Hz=Bits/(Symbol Interval) for the trellis symbol demodulation algorithm and the trellis bit demodulation algorithm respectively using equations (17) to calculate the number of trellis states and calculating the information bits b vs. $n_p$ performance for PSK and QAM from FIG. 3,4. For trellis symbol demodulation, FIG. 12 calculates the number of trellis states $n_t$ vs. b for 4-PSK in 200, 8-PSK in 201, 16-QAM in 202, 64-QAM in 203, and 256-QAM in 204. For trellis bit demodulation, FIG. 13 calculates the number of trellis states $n_t$ vs. b for 4-PSK in 205, 8-PSK in 206, 16_QAM in 207, 64-QAM in 208, and 256-QAM in 209. FIG. 13 compared to FIG. 12 illustrates a reduction in computational complexity using the trellis bit demodulation algorithm compared to the trellis symbol demodulation algorithm.

In FIG. 13 the number of bit passes is equal to the number of modulation bits $b_s$ per data symbol which number multiplies the number of trellis states to calculate the equivalent number of trellis states for the bit algorithm. The data symbol rate reduction required to implement the bit error correction decoding is not factored into these plots since the required code rates are expected to be relatively high and have not been established. With the bit algorithm the complexity of the data symbol modulation may require the simultaneous demodulation of more than one bit for each data symbol in order to reduce the bit(s) decisioning loss and this could increase the complexity of the bit algorithm. Also not factored into these plots is the impact of the differences in the $n_p$ over the $T_s$ interval for the same values of b since the number of data symbol modulations is equal to $n_p n_t$ over a $T_s$ interval for the same values of b.

FIG. 14 illustrates the decisioning manifolds and bit sequencing for QLM 8-PSK demodulation using a trellis bit detection algorithm. In 190 the 8-PSK data symbol modulation is mapped onto a unit circle in the complex plane using the binary representation $b_0 b_1 b_2$ for the $b_s$=3 bit phase states $n_s$=8=2^(3 bit) with the zero state 191 equal to $b_0 b_1 b_2$=000. The 8-PSK phase states are arranged as a Gray code with the third bit $b_2$=0,1 values on the respective bit $b_o, b_1$ decisioning boundaries 195,199 of their manifolds in the complex plane to reduce the impact of the undecided bit $b_2$ on the decisioning performance of $b_o$, $b_1$. It is well known that the Gray code reduces the probability of a multibit error and the BER for a given data symbol error since the neighboring symbols differ from each other by only one bit position.

In 192 the decisioning manifolds for the first bit $b_0$ are the respective subspaces of the complex plane 194 with real axis x and complex axis jy wherein j=√(-1), specified by $b_0$=0 decisioning 193 and $b_1$=1 decisioning 193 with the decisioning boundary 195 separating the manifolds. In 196 the decisioning manifolds for the second bit $b_1$ are the respective subspaces of the complex plane 198 specified by $b_1$=0 decisioning 197 and $b_1$=1 decisioning 197 with the decisioning boundary 199 separating the manifolds. In 196 the bit $b_1$ decisioning is conditioned on the knowledge of the first bit $b_0$ being $b_0$=0,1. This means for $b_0$=0 the decisioning manifolds in 196 are restricted to the $b_0$=0 manifold in 192 and for $b_0$=1 to the $b_0$=1 manifold in 192.

FIG. 15 is a flow diagram of a trellis bit demodulation algorithm with correlated bit error correction encoding and decoding. The algorithm is initialized with the parameter set in 210 which is the parameter set 170 in FIG. 9A with the identification of the bit representation $b_0 b_1 b_2 \ldots b_{s-1}$ of the $b_s$ bit trellis states for the data modulation and definition of the corresponding decisioning boundaries and metrics for calculation of the trellis state transition metric $R_k$(jxi) in 152 in FIG. 9B in the trellis symbol algorithm.

The trellis bit algorithm 211 implements the trellis symbol algorithm in FIG. 9 with the symbols reduced to the first bit $b_0$ for each of the correlated data symbols to initiate the algorithm in the first trellis pass, implements the data symbol words $b_0 b_1$ for the next trellis pass with the bits $b_0$ estimated from the first pass, and so forth until the complete data symbol words $b_0 b_1 b_2 \ldots b_{s-1}$ have been recovered. In each pass the trellis state transition metric $R_k$(jxi) in 152 in FIG. 9B in the trellis symbol algorithm is calculated using the definition of the corresponding decisioning boundaries and metrics in 210 following the procedure outlined in FIG. 14 for 8-PSK and the estimated bit values from the previous trellis passes.

Bit estimates from the trellis bit algorithm are error correction decoded and re-encoded 213 to correct the decisioning errors resulting from a combination of noise and the non-optimal nature of the bit decisioning metrics. Bit decisioning metrics are non-optimal when there are unknown higher order bits which are undefined since the multi-layer correlations of the parallel QLM channels introduce random fluctuations contributed by these higher order bits. The error correction code finds the correct bit sequence and then regenerates the original encoded bit sequence to enable the next bit pass to be implemented with a relatively clean estimate of the bits in the previous pass. This bit error correction is intended to improve the performance of the trellis bit algorithm. Depending on the tolerance to performance loss this bit error correction can be deleted to avoid the relatively small loss in communications capacity due to the anticipated relatively high rate of the bit encoder.

The sequencing continues 214 when there is another bit to be processed whereupon the corrected bit estimate from the bit error correction 213 is handed off 216 to the trellis bit algorithm 211 for the next pass. When the next-to-last bit has been estimated and corrected by the bit error correction 213 the algorithm stops the sequencing 212 and hands off the estimated data symbols and metrics 217 to the trellis decoding 215 which implements the trellis error correction decoding 172 in FIG. 9A, hands off the bit estimates 219 to the receiver for further processing, and returns 218 to the trellis algorithm for the processing of the next data symbol or symbols. Alternatively, the trellis demodulation is completed or partially completed before handing off the data symbol estimates and metrics to the trellis decoding algorithm 215.

FIG. 16 is a flow diagram of an interative trellis bit algorithm wherein the iteration is used to incorporate the effects of the sidelobes of the correlation function into the trellis state transition metric $R_k$(jxi) in 152 in FIG. 9B in the non-iterative trellis symbol algorithm with a relatively small increase in computational complexity. In FIG. 16 the algorithm is initialized with the parameter set in 220 which is the parameter set in 210 in FIG. 15 with the partitioning of the correlation vector C into the mainlobe vector $C_0$ plus the sidelobe vector $C_1$ and adding the specification of the stopping rule for the iterations. For a correlation vector C=[c(0), c(1), ..., c($n_p$-1), c($n_p$), ..., c($n_c$)] consisting of $n_c$ correlation coefficients, the mainlobe vector is $C_0$=[c(0),c(1), ..., c($n_p$-1),0, 0, ..., 0] and the sidelobe vector is $C_1$=[0, 0, ..., 0,c($n_p$), ..., c($n_c$)] to partition C=$C_0$+$C_1$.

The iterative algorithm starts 221 by implementing the trellis algorithm 171 in FIG. 9A with the symbols reduced to the first bits $b_0$ for the correlation mainlobe using the non-zero $C_0$ coefficients. Output bit estimates from the trellis bit algorithm 221 are used to calculate the a-priori estimated sidelobe contribution $\hat{X}_{k|1}$ in 223 to $\hat{X}_k$(jxi) which is the hypothesized normalized detected correlated symbol k for the path jxi in the calculation of the metric $R_k(jxi)$ in 152 in FIG. 9B. In this implementation 224 of the trellis algorithm 171 in FIG. 9A, the $\hat{X}_k(jxi)=\hat{X}_{k|0}(jxi)+\hat{X}_{k|1}$ is the sum of the hypothesized mainlobe contribution $\hat{X}_{k|0}(jxi)$ using the non-zero $C_0$ coefficients as described in FIG. 9 and the sidelobe constibution $\hat{X}_{k|1}$ using the bit estimates from 221 and the non-zero $C_1$ coefficients and wherein the subscripts "k|0" reads "index k given $C_0$" and "k|1" reads "index k given $C_1$". From 152 in FIG. 9B we find the $\hat{X}_{k|0}(jxi)$ is defined by the equation $\hat{X}_{k|0}(jxi)=c(n_p-1)[sr(1)+sr(2n_p-1)]+\ldots+c(1)[sr(n_p-1)+sr(n_p+1)]+c(0)[sr(n_p)]$ which calculates $\hat{X}_{k|0}(jxi)=\hat{X}_k(jxi)$ in FIG. 9B as the correlated weighted sum of the elements of the shift register $SR=[sr(1),sr(2),\ldots,sr(2n_p-1)]'$ with $\hat{Z}_k=sr(n_p)$, $\hat{Z}_{k-1}=sr(n_p-1)$, $\hat{Z}_{k+1}=sr(n_p+1)$, ... where $c(0)=1$, the normalized data symbol estimates $\{\hat{Z}_k\}$ correspond to the transition index jxi, and the state k estimated symbol $\hat{Z}_k$ is the SR center element $sr(n_p)$ with correlation coefficient $c(0)=1$. Symbols (bits) move from left to right starting with "j" with each new received symbol or step in the trellis recursion algorithm, and ending with "i". With this convention "j" is indexed over the states of $sr(1)$, "x" is indexed over the current states of $sr(2),\ldots,sr(2n_p-2)$, and "i" is indexed over the states of $sr(2n_p-1)$. Index over the paths of the trellis diagram is defined by the equation $jxi=sr(1)+n_s\ sr(2)+n_s^2 sr(3)+\ldots+n_s^{\hat{}}(2n_p-2)\ sr(2n_p-1)-1=0, 1, 2, \ldots, n_s^{\hat{}}(2n_p-1)-1$ when the contents of the SR elements are the indices corresponding to the assumed data symbol state values. The sidelobe contribution is equal to $\hat{X}_{k|1}=c(n_p)(\hat{Z}_{k-n_p}+\hat{Z}_{k+n_p})+c(n_p+1)(\hat{Z}_{k-1-n_p}+\hat{Z}_{k+1+n_p})+c(n_p+2)(\hat{Z}_{k-2-n_p}+\hat{Z}_{k+2+n_p})+\ldots$ until the end of the sidelobe correlation coefficients or the end of the data symbol bit estimates and wherein $\hat{Z}_{k-n_p}$ is the data symbol bit estimate in 223 for symbol $k-n_p$.

Output of this modified trellis bit algorithm 224 is the set of data symbol bit estimates which are error correction decoded and re-encoded 226 to correct the decisioning errors. A stopping rule in 227 is used to decide if another iteration is required. When another iteration is required the data symbol bit estimates are used 230 to update the calculation 223 of the a-priori contribution $\hat{X}_{k|1}$ of the sidelobes to the $\hat{X}_k(jxi)$ in the modified trellis algorithm 224. With no further iteration the next bit 228 is processed 225 by the trellis bit algorithm 221 whereupon the corrected bit estimate from the bit error correction 226 is used to generate the sidelobes 223 for the trellis bit algorithm 224 to begin the next set of iterations. When the next-to-last bit has been estimates and corrected by the bit error correction 226 and the iteration algorithm completed 227, the estimated data symbols and metrics are handed off to the trellis error correction decoding 229 which implements the trellis error decoding 172 in FIG. 9A, hands off the data estimates 232 to the receiver for further processing, and returns 231 to the trellis bit algorithm for processing the next data symbol or symbols when the trellis error correction decoding 229 is interleaved with the trellis demodulation. Alternatively, the trellis demodulation is completed or partially completed before handing off the data symbol estimates and metrics to the trellis decoding algorithm 229.

For step 2 there are several ways to reduce the computational complexity at the expense of some performance loss for the trellis symbol and bit algorithms and the iterative trellis symbol and bit algorithms. A method to reduce computational complexity is to reduce the number of trellis states jx and transition paths jxi in 151, 152, 153, 154 in FIG. 9B in the trellis algorithm by eliminating the trellis states and trellis paths in 154 in FIG. 9B which have relatively poor values of the path metric $\alpha_k(jx)$ used to define the new symbol $\hat{Z}_k$ and path. A second method to reduced the computational complexity is to reduce the number of trellis states by eliminating the lower correlation values of the sidelobes and mainlobe. A third method to reduce the computational complexity is to modify the iterative algorithm to calculate the forward trellis performance using the forward half of the mainlobe and followed by a backward trellis algorithm using the other half of the mainlobe wherein the trellis algorithm in FIG. 9 is a forward algorithm and the backward algorithm simply replaces the forward recursive metric equation $\alpha_k(jx)=\alpha_{k-1}(xi)+R(jxi)$ with the backward recursive equation $\beta_{k-1}(jx)=\beta_k(xi)+R(jxi)$ and runs the trellis algorithm in reverse by proceeding with k, k-1, k-2, ... and wherein $\beta_{k-1}(jx)$ is the backward state metric used to define the new symbol $\hat{Z}_{k-1}$ and path as described in application Ser. No. 10/772,597. A fourth method to reduce the computational complexity it so change the forward-backward algorithm to incorporate techniques to eliminate the trellis state and trellis paths with relatively poor performance metrics. These are examples of the various algorithms for reducing the computational complexity at the expense of reducing the demodulation performance. Sequential demodulation techniques, partial symbol and bit integration over $\Delta T_s$ and $\Delta k$ intervals, and other demodulation techniques are available as potential candidates for QLM demodulation. The present invention is not intended to be limited to these QLM demodulation methods and techniques shown herein but is to be accorded the wider scope consistent with the principles and novel features disclosed herein.

FIG. 17 modifies elements of the QLM trellis symbol algorithm in FIG. 9 which uses a ML decisioning metric or a MAP decisioning metric disclosed in the recent U.S. Pat. No. 7,337, 383 B1 or another decisioning metric, to record the decisioning metrics for each of the demodulated symbols for later use in a soft-decisioning decoding algorithm implemented with a MAP decoding algorithm in equations (5), a convolutional decoding algorithm in equations (10),(11), a turbo decoding algorithm in equations (7), (8), a block algorithm, or other decoding algorithm. Numbering of the elements in FIG. 17 is the same as in FIG. 9 whenever possible. The QLM algorithm is started in FIG. 17A using a set of trellis parameters 170 followed by initialization 150 as described in the text for FIG. 9B. Loop 151 processes the Rx symbols k=1, 2, ..., n where the index k also refers to the corresponding algorithm steps and to the states of the trellis algorithm. In 152 the Rx signals are pulse detected to remove the carrier frequency and waveform and to recover a normalized correlated data symbol $Y_k$. For each Rx symbol $Y_k$ the state transition decisioning metrics $R_k(jxi)$ are calculated by the logarithm transition metric equations $\{R_k(jxi)=-|Y_k-\hat{X}_k(jxi)|^2\}$ for a ML metric, $\{R_k(jxi)=|\hat{X}_k|^2-2Real(Y_k\hat{X}_k(jxi)^*)\}$ for a MAP metric wherein $(o)^*$ is the complex conjugate of $(o)$, and $\{R_k(jxi)=metric(Y_k, \hat{X}_k)\}$ for another metric, for all possible transition paths $\{jxi\}$ from the previous state $S_{k-1}(xi)$ at node xi to the new state $S_k(jx)$ at node jx in the trellis diagram snd where $\hat{X}_k(jxi)$ is the hypothesized normalized detected correlated symbol k for the path jxi.

Loop 153 calculates the best trellis transition paths from state $S_{k-1}$ to the new state $S_k$ for the new nodes jx=0, 1, 2, ..., $n_s^{\hat{}}(2n_p-2)-1$. In 154 the path metric $\alpha_k(S_k)$ is defined by the recursive logarithm equation $\alpha_k(S_k)=\alpha_{k-1}(S_{k-1})+R(S_{k-1}->S_k)$ which can be rewritten as $\alpha_k(jx)=\alpha_{k-1}(xi)+R(jxi)$ since the state $S_k$ corresponds to node jx, state $S_{k-1}$ corresponds to node xi and the state transition from $S_{k-1}$ to $S_k$ represented symbolically as $S_{k-1}->S_k$ corresponds to the path jxi.

In 154 in 17A representative implementation 300 is presented to "Find the best path metric $\alpha_k(jx)$" in 154 in FIG. 9B. For symbol k and for each index jx=0, 1, ..., $n_s^{\hat{}}(2n_p-2)-1$ over the new nodes in the trellis state diagram, the loop "For ki=0, 1, . . . , 2^b_s−1" over the states of the data symbol k calculates and stores the path metric $m_k(ki)=\alpha a_{k-1}(xi)+R(jxi)$. Next, the Matlab calculation "[mx, mi]=max($m_k$)" finds the maximum value of the metric "$\alpha_k(jx)$=mx" wherein mx is the maximum value of $m_k$ and finds the data symbol $\hat{Z}_k$ which is specified by the corresponding data symbol index mi that yields the maximum "max". The operation of taking the "max" enables the path metric to be re-interpreted as a function of "jx" which supports this definition "$\alpha_k(jx)$=mx".

In 154 in FIG. 17B a representative implementation 304 is presented to "Update the state matrix" in 154 in FIG. 9B. Matlab code calculates "xi=jx_xi(jz,ki)" wherein "xi" are the previous nodes in the trellis state diagram specified by the maximum value of ki found in the previous 300. This allows the state matrix to be updated using the Matlab calculation "$S_k(:,jx)=S_{k-1}(\hat{Z}_k,1:D-1, xi)$" which calculates the state matrix "$S_k(:,jx)$" for all rows ":" for column "jx" as the previous state matrix "$S_{k-1}(\hat{Z}_k,1:D-1, xi)$" for column "xi" with the entry in the first row equal to $\hat{Z}_k$ after the other rows have been moved down one step. State matrices $S_k,S_{k-1}$ in this Matlab implementation are "D rows by $n_s\hat{\ }(2n_p-2)$ columns". The corresponding data symbol decisioning metric matrix "$M_k$" is updated by the same Matlab calculation with the substitution of the optimum decisioning metric "$m_k$" replacing the optimum $\hat{Z}_k$ wherein $m_k$ is an array of 2^b_s decisioning metric values over all possible states of $\hat{Z}_k$. This ends the jx loop 153.

In 154 in FIG. 17C a representative implementation 307 is presented to execute "For k≧D find best path in $S_k$ and $\hat{Z}_{k-D}$" in 154 in FIG. 9B. For symbols k≧D Matlab code finds the maximum value of the state metric $\alpha_k(jx)$ over all jx and the corresponding value "mjx" of jx yielding the maximum, by implementing the Matlab function "[m$\alpha_k$, mjx]=max($\alpha_k$)". The "mjx" is the best path in $S_k$ for step k, and the corresponding best estimate of the data symbol at the previous step k−D along this best path is equal to "zz(k−D)=$S_k$(D,mjx)=$\hat{Z}_{k-D}$" which reads the QLM estimated data symbol "zz(k−D)" at step k−D is equal to the data symbol estimate $\hat{Z}_{k-D}$ in row D column mjx of the state matrix $S_k$. Path delay equal to D steps provides improved trellis performance and the mjx specifies the column of $S_k$ which stores the best path data symbols over the previous D steps. The corresponding data symbol metric $m_{k-D}$ for the best data symbol estimate $\hat{Z}_{k-D}$ is read from the decisioning metric matrix $M_k$ and is equal to the mjx in row D and column mjx of the $M_k$. This continues until k=n and ends the k loop 151 in FIG. 17C.

In 162 in FIG. 17D a representative implementation 309 is presented to execute "In steps k>n to k=n+D−1 recover the remaining D−1 data symbol estimates". In this example, the k values are restricted to n symbols and the additional D-! steps in FIG. 9C are executed by the loop "For dk=1, . . . , D−1" in FIG. 17D which continues the selection of the best data symbol estimate along the selected best column of $S_n$ by executing "ss(n−D+1+dk)=$S_n$(D−dk,mjx)" and likewise continues the selection of the best decisioning metric along the selected best column of $M_n$ by executing "mm(n−D+1+dk)=$M_n$(D−dk,mjx)". This completes the demodulation of QLM to derive the data symbol estimates $\hat{Z}_k$=ss(k) and the corresponding decisioning metrics $m_k$=mm(k) for each of these estimates for the k=1, 2, . . . , n QLM data symbol inputs as summarized in 310.

FIG. 18 describes representative QLM decoding architectures which are concatenated demodulation-decoding architectures that perform error correction decoding after QLM trellis demodulation, and parallel decoding architectures which perform both the QLM trellis demodulation and soft-decisioning decoding in parallel. This invention is not intended to be limited to these QLM decoding architectures shown herein but is to be accorded the wider scope consistent with the principles and novel features disclosed herein.

FIG. 18A describes a representative communications transmitter for parallel and concatenated decoding architectures. User data bits 330 are symbol encoded 331 to generate the stream of data symbols $Z_k$ 332 which are handed over to the QLM signal generator (Gen.) 335 whose output 336 is the stream of correlated data symbols $Y_k$ at the QLM data symbol rate. The QLM correlated data symbols $Y_k$ at baseband are 338 digital-to-analog coverted, bandwidth limited filtered, signal-sideband up-converted to an intermediate frequency IF, translated from IF to the radio transmission frequency RF represented by the symbol IF-RF, power amplified (Amp.) and transmitted Tx 339 as an RF signal.

FIG. 18B describes representative parallel and concatenatd decoding architecture for communications receivers. Received Rx RF signal 340 is the transmitted signal 338 in FIG. 18. This Rx signal is 341 downconverted from RF to IF represented by the symbol RF-IF, inphase/quadrature detected fo separate the real or inphase signal and the imaginary or quadrature signal, bandwidth limited filtered, synchronized in time and frequency, and analog-to-digital ADC converted at the QLM data symbol rate to recover estimates 342 of the transmitted QLM signal $Y_k$. It is convenient to use the same notation for the transmitted and received QLM signal $Y_k$ which is in the format required for QLM trellis demodulation.

In the parallel architecture the trellis demodulation 348 in FIG. 18B is modified as follows to perform the error correction decoding in parallel with the trellis demodulation. Consider the FIG. 17 version of the trellis algorithm in FIG. 9 since the algorithm block diagram is in greater detail, and which only differs from FIG. 9 in the introduction of the decisioning metrics which will be deleted for this application. The state transition decisioning metric $R_k$(jxi) in 152 in FIG. 17A for index k is a function of the received data symbol $Y_k$ and the $\hat{X}_k$(jxi) which is the hypothesized normalized detected correlated symbol k for the path jxi. The error correction encoding generator is used to find the admissible values of jzi to implement the $\hat{X}_k$(jxi) as a function of the hypothesized values of the input data and to evaluate the state transition decisioning metric $R_k$(jxi) at each step k of the trellis algorithm as a function of the hypothesized input data. Each data symbol encoded with a $b_s$ bit encoded data word is generated by a b bit input dats word conditioned on the previous words in the input data stream. This means each estimated data symbols $\hat{Z}_k$ is replaced by the estimated b-bit data word $dd_k$ which together with the previous words generate this $b_s$-bit data symbol $\hat{Z}_k$ in the trellis algorithm.

In FIG. 17A in 300 to "Find the best path metric $\alpha_k$(jx)" in 154 in FIG. 9B the best path metric is found for all values of the last data symbol index ki=0, 1, . . . , 2^b_s−1 and the corresponding QLM data symbol data word is $dd_k$ for max state mi as describe in the previous text in place of the $\hat{Z}_k$.

In FIG. 17B in 154 a representative implementation 304 is presented to "Update the state matrix" in 154 in FIG. 9B. Matlab code calculates "xi=jx_xi(jz,ki)" wherein "xi" are the previous nodes in the trellis state diagram specified by the current state jx and the maximum value of ki found in the previous 300. This allows the state matrix to be updated using the Matlab calculation "$S_k(:,jx)=S_{k-1}(dd_k;1:D-1, xi)$" which calculates the state matrix "$S_k(:,jx)$" for all rows ":" for column "jx" as the previous state matrix "$S_{k-1}(dd_k,1:D-1, xi)$" for column "xi" with the entry in the first row equal to $dd_k$ after the other rows have been moved down one step.

In 154 in FIG. 17C a representative implementation 307 is presented to execute "For k≧D find best path in $S_k$ and $dd_{k-D}$" in 154 in FIG. 9B. For symbols k≧D Matlab code finds the maximum value of the state metric $\alpha_k(jx)$ over all jx and the corresponding value "mjx" of jx yielding the maximum, by implementing the Matlab function "[$m\alpha_k$, mjx]=max($\alpha_k$)". The "mjx" is the best path in $S_k$ for step k, and the corresponding best estimate of the data word at the previous step k–D along this best path is equal to "dd(k–D)=$S_k$(D,mjx)=$dd_{k-D}$" which reads the QLM estimated data word "dd(k–D)" at step k–D is equal to the data word estimate $dd_{k-D}$ in row D column mjx of the state matrix $S_k$. This continues until k=n and ends the k loop 151 in FIG. 17C.

in FIG. 17D in 162 a representative implementation 309 is presented to execute "In steps k>n to k=n+D–1 recover the remaining D–1 data word estimates". In this example, the k values are restricted to n symbols and the additional D–! steps in FIG. 9C are executed by the loop "For dk=1, . . . , D–1" in FIG. 17D which continues the selection of the best data word estimate along the selected best column of $S_n$ by executing "dd(n–D+1+dk)=$S_n$(D–dk,mjx)". This completes the parallel demodulation and decoding of QLM to derive the data word estimates $dd_k$=dd(k) with the outputs in 310 in FIG. 17D replaced by $dd_k$=dd(k) wherein $dd_k$ is a "b" bit data word and in 350 in FIG. 15B the output word dd(k) is equal to dd(k)= $dd_k$=$d_{k,b-1}$, . . . , $d_{k,1}$,$d_{k,0}$.

In the concatenated architecture the trellis demodulation 343 in FIG. 18B implements the trellis demodulation algorithm in in FIG. 17 as described in the previous to generate the outputs in 310 in FIG. 17D and listed in 344 in FIG. 18B, which outputs are the estimated values $\hat{Z}_k$=zz(k) of the n transmitted QLM data symbols and the corresponding decisioning metrics $m_k$=mm(k) for each of these data symbol estimates. These outputs are converted 345 into the corresponding $b_s$ bit data words for each of the data symbols and their metrics are given as functions of these data bit words, to generate outputs $d_{k,bs-1}$, . . . , $d_{k,1}$, $d_{k,0}$<=>zz(k)=$\hat{Z}_k$ an $m_{k,bs-1}$, . . . , $m_{k,1}$, $m_{k,0}$<=>mm(k)=$m_k$ wherein the symbol "<=>" reads "equivalent to". These data bit words and decisioning metrics can be used for soft decisioning decoding 347 with some of the algorithms listed. The metric values are the measured state transitioning decisioning metric values Rk(jxi) used for soft decisionind decoding Including MAP decoding in equations (5), convolutional decoding in equations (10),(11), turbo decoding in FIG. 1,2 and equations (7),(8), and for block decoding. The decisioning metric performance reflects the choice of decisioning metric used in the algorithm in FIG. 17. These decisioning metrics replace the decisioning measurements normally available in the received data for applications of these soft decisioning algorithms.

It should be obvious to anyone skilled in the communications art that this example implementation in FIG. 17,18 clearly defines representative architectures for implementing QLM demodulation and error correction decoding relevant to this invention disclosure, and it is obvious that this invention disclosure includes all architecture, methods, implementations, and algorithms for performing QLM demodulation and error correction decoding. This invention is not intended to be limited to these QLM decoding methods and techniques shown herein but is to be accorded the wider scope consistent with the principles and novel features disclosed herein.

OFDMA quadrature parallel-layered modulation QLM can increase the data rate either using timing offsets or using frequency offsets or using a combination of both, as the communications parameter which is changed between layers to allow separability of the layers and recovery of the layered transmitted data in the receiver. OFDMA QLM with frequency offsets is implemented in FIG. 19 in a transmitter and in FIG. 22 in a receiver.

FIG. 19 is a transmitter block diagram modified to support OFDMA QLM with frequency offsets to increase the symbol transmission rate from $1/T_s$ to the QLM rate $n_p/T_s$ and with an increase in transmitter power to support this increased data rate. Ideal OFDMA modulates N input data symbols at the sample rate $1/T_s$ over the time interval NT, with an N-point inverse fast fourier transform $FFT^{-1}$ to generated N harmonic waveforms $e^{\hat{}}j2\pi kn/N$ with each modulated by the corresponding data symbol wherein the normalized frequencies k=0, 1, . . . N–1 correspond to channels 0, 1, . . . , N–1, "j"=$\sqrt{(-1)}$, "$\pi$=pi", and "n" is a time index. Data symbol output rates are 1/NT, per channel and the N channels have a total symbol rate equal to $N/NT_s$=$1/T_s$=B=(Nyquist sample rate). Signal processing starts with the stream of user input data words $\{d_k\}$ 46 with k indexed over the words. Frame processor 47 accepts these data words and performs turbo error correction encoding, error detection cyclic redundant encoding CRC, frame formatting, and passes the outputs to the symbol encoder 48 which encodes the frame data words into data symbols for handover to the OFDMA QLM signal processing. QLM transmits in parallel N received data symbols for each of the $n_p$ $FFT^{-1}$ signal processing steams. Each set of received N data symbols are offset in frequency by 0, $\Delta k$, $2\Delta k$, . . . , $(n_p-1)\Delta k$ with $\Delta k$=$1/n_p$ using the normalized frequency index k and are implemented in 49 by the frequency translation operator with $FFT^{-1}$ time sample index n. Following this frequency translation and $FFT^{-1}$ signal processing, the output streams of the OFDMA encoded symbols for the $n_p$ frequency offsets are summed 51 and waveform encoded. The output stream of up-sampled complex baseband signal samples 52 $\{z(t_i)\}$ at the digital sample times $t_i$ with digitization index i, is handed over to the digital-to-analog converter DAC, and the DAC output analog signal z(t) is single sideband SSB upconverted 52 to RF and transmitted as the analog signal v(t) wherein v(t) is the real part of the complex baseband signal z(t) at the RF frequency. Non-ideal OFDMA has a separation interval between contiguous $FFT^{-1}$ data blocks to allow for timing offsets and the rise and fall times of the channelization filter prior to the $FFT^{-1}$ processing.

CDMA quadrature parallel-layered modulation QLM can increase the data rate either using timing offsets or using frequency offsets or using a combination of both, as the communications parameter which is changed between layers to allow separability of the layers and recovery of the layered transmitted data in the receiver. CDMA QLM with frequency offsets is implemented in FIG. 20 in a transmitter and in FIG. 23 in a receiver. Using a Hybrid Walsh or a generalized Hybrid Walsh CDMA orthogonal channelization code developed in U.S. Pat. No. 7,277,382 and patent application Ser. No. 09/846,410 localizes the frequency spread of the decoded CDMA signal so that it is feasible to use a trellis algorithm for decoding. With timing offsets the CDMA block codes have to be reshuffled so that the encoded data symbols Z(n(k))=$\Sigma_u$Z (u)C(u,n(k)) over blocks k=0, 1, 2, . . . are grouped together for each n to ensure that the timing offsets are not introducing unwanted cross-correlations between CDMA channels.

FIG. 20 is a transmitter block diagram modified to support CDMA QLM with frequency offsets to increase the symbol transmission rate from $1/T_s$ to the QLM rate $n_p/T_s$ and to increase the transmitter power level to support this increased data rate. Signal processing starts with the stream of user input data words $\{d_k\}$ 101 with k indexed over the words. Frame processor 102 accepts these data words and performs the turbo error correction encoding, error detection cyclic redundant encoding CRC, frame formatting, and passes the outputs to the symbol encoder 103 which encodes the frame data words into data symbols for handover to the CDMA QLM signal processing. Similar to OFDMA the frequency translation is performed 104 and the output streams of the CDMA encoded 105 symbols for the n frequency offsets are summed 106 and waveform encoded and the up-sampled output stream of complex baseband signal samples 107 $\{z(t_i)\}$ at the digital sample times $t_i$ with digitization index i, is handed over to the DAC and the DAC output analog signal z(t) is SSB upconverted 107 to RF and transmitted as the analog signal v(t) wherein v(t) is the real part of the complex baseband signal z(t) at the RF frequency.

OWDMA quadrature parallel-layered modulation QLM can increase the data rate either using timing offsets or using frequency offsets or using a combination of both, as the communications parameter which is changed between layers to allow separability of the layers and recovery of the layered transmitted data in the receiver. OWDMA QLM with timing offsets is implemented in FIG. 21 in a transmitter and in FIG. 24 in a receiver. OWDMA was developed in patent application Ser. Nos. 09/826,118. OWDMA generates a uniform bank of orthogonal Wavelet filters with the same spacing and symbol rate as OFDMA and with the advantage that the individual channels remain orthogonal with timing offsets and are less sensitive to frequency offsets.

FIG. 21 is a transmitter block diagram modified to support OWDMA QLM with time offsets to increase the symbol transmission rate from $1/T_s$ to the QLM rate $n_p/T_s$ and to increase the transmitter power level to support this increased data rate. Signal processing starts with the stream of user input data words $(d_k)$ 111 with k indexed over the words. Frame processor 112 accepts these data words and performs the turbo error correction encoding, error detection cyclic redundant encoding CRC, frame formatting, and passes the outputs to the symbol encoder 113 which encodes the frame data words into data symbols for handover to the OWDMA QLM transmit signal processing. The $n_p$ time delays 0, $\Delta T_s$, $2\Delta T_s$, $3\Delta T_s$, ..., $(n_p-1)\Delta T_s$ wherein $\Delta T_s = T_s/n_p$, are performed 114 and the output streams of the OWDMA waveform encoded 115 symbols for the $n_p$ time delays are summed 116 and passband waveform encoded and the up-sampled output stream of complex baseband signal samples 117 $\{z(t_i)\}$ at the digital sample times $t_i$ with digitization index i, is handed over to the DAC and the DAC output analog signal z(t) is single sideband SSB upconverted 117 to RF and transmitted as the analog signal v(t) wherein v(t) is the real part of the complex baseband signal z(t) at the RF frequency.

Other communications applications include TDMA QLM and FDMA QLM. Frequency hopped FH QLM is a layered QLM modulation with multiple access being provided by the FH on the individual hops. PPM QLM can be layered with QLM similar to QAM when the symbol modulation is replaced by pulse-position-modulation PPM. For GMSK QLM the transmitter is modified by the QLM symbol rate increase.

FIG. 22 is a receiver block diagram modified to support OFDMA QLM from the OFDMA QLM transmitter in FIG. 17. Receive signal processing for QLM demodulation starts with the wavefronts 54 incident at the receiver antenna for the $n_u$ users u=1, ..., $n_u \leq N_c$ which are combined by addition in the antenna to form the receive Rx signal $\hat{v}(t)$ at the antenna output 55 where $\hat{v}(t)$ is an estimate of the transmitted signal v(t) 52 in FIG. 19 that is received with errors in time $\Delta t$, frequency $\Delta f$, and phase $\Delta\theta$. This received signal $\hat{v}(t)$ is amplified and downconverted to baseband by the analog front end 56, synchronized (synch.) in time t and frequency f, waveform removed to detect the received QLM signal at the QLM symbol rate, inphase and quadrature detected (I/Q), and analog-to-digital ADC converted 57. ADC output signal is demultiplexed into $n_p$ parallel signals 58 which are offset in frequency by 0, $-\Delta k$, $-2\Delta k$, ..., $-(n_p-1)\Delta k$ wherein $\Delta k=1/n_p$ and processed by the FFT's. Outputs are trellis decoded 59 with an algorithm comparable to the algorithm defined in FIG. 9 for QLM PSK. Outputs are further processed 60,61 to recover estimates $\hat{d}_k$ of the transmitted data $d_k$ with k indexed over the data words.

FIG. 23 is a receiver block diagram modified to support CDMA QLM from the CDMA QLM transmitter in FIG. 18. Receive signal processing for QLM demodulation starts with the wavefronts 121 incident at the receiver antenna for the $n_u$ users u=1, ..., $n_u \leq N_c$ which are combined by addition in the antenna to form the receive Rx signal $\hat{v}(t)$ at the antenna output 122 where $\hat{v}(t)$ is an estimate of the transmitted signal v(t) 107 in FIG. 20 that is received with errors in time $\Delta t$, frequency $\Delta f$, and phase $\Delta\theta$. This received signal $\hat{v}(t)$ is amplified and downconverted to baseband by the analog front end 123, synchronized (synch.) in time t and frequency f, waveform removed to detect the received QLM signal at the QLM symbol rate, inphase and quadratue detected (I/Q), and analog-to-digital ADC converted 124. ADC output signal is demultiplexed into $n_p$ parallel signals 125 which are offset in frequency by 0, $\Delta k$, $2\Delta k$, ..., $(n_p-1)\Delta k$ and processed by the CDMA decoders. Outputs are trellis decoded 126 with an algorithm comparable to the algorithm defined in FIG. 9 for QLM PSK. Outputs are further processed 127,128 to recover estimates of the transmitted data $d_k$ wherein k is indexed over the data words.

FIG. 24 is the receiver block diagram modified to support OWDMA QLM from the OWDMA transmitter in FIG. 19. Receive signal processing for QLM demodulation starts with the wavefronts 131 incident at the receiver antenna for the $n_u$ users u=1, ..., $n_u \leq N_c$ which are combined by addition in the antenna to form the receive Rx signal $\hat{v}(t)$ at the antenna output 132 where $\hat{v}(t)$ is an estimate of the transmitted signal v(t) 117 in FIG. 21 that is received with errors in time $\Delta t$, frequency $\Delta f$, and phase $\Delta\theta$. This received signal $\hat{v}(t)$ is amplified and downconverted to baseband by the analog front end 133, synchronized (synch.) in time t and frequency f, waveform removed to detect the received QLM signal at the QLM symbol rate, inphase and quadrature detected (I/Q) and analog-to-digital ADC converted 134. ADC output signal is demultiplexed into $n_p$ parallel signals 135 which are offset in time by 0, $\Delta T_s$, $2\Delta T_s$, ..., $(n_p-1)\Delta T_s$ and processed by the OWDMA decoders. Outputs are trellis decoded 136 with an algorithm comparable to the algorithm defined in FIG. 9 for QLM PSK. Outputs are further processed 137,138 to recover estimates $\hat{d}_k$ of the transmitted data $d_k$ wherein k is indexed over the data words.

Consider the QLM modulation and demodulation algorithms and implementation for GMSK. QLM increases the data rate by transmitting $n_p > 1$ layers of data encoded Gaussian frequency pulses that are time synchronized for transmission at $T_s/n_p$, $2T_s/n_p$, ..., $(n_p-1)T_s/n_p$ offsets respectively for layers 2, 3, ..., $(n_p-1)$ relative to the ground or $1^{st}$ layer of GMSK. This means the bit-rate increases from $1/T_s$ to $n_p/T_s$ and the bit or symbol time remains the same at $T_s$. The trellis algorithm in FIG. 9 is combined with the Viterbi algorithm, with suitable modifications to model the architecture of the GMSK demodulator.

This patent covers the plurality of everything related to QLM generation, QLM demodulation, and data recovery of QLM and to the corresponding bounds on QLM to all applications of QLM inclusive of theory, teaching, examples, practice, and of implementations for related technologies. The representative transition metric and trellis algorithms for QLM demodulation are examples to illustrate the methodology and validate the performance and are representative of all QLM demodulation algorithms including maximum likelihood ML, maximum a posteriori MAP, maximum a priori, finite field techniques, direct and iterative estimation techniques, trellis symbol and iterativw trellis symbol and with/without simplifications, trellis bit and iterative trellis bit and with/without simplifications and with/without bit error correction coding, and all other related algorithms whose principal function is to recover estimates of the transmitted symbols for QLM parallel layered modulation as well as data recovery related to QLM and the QLM bounds.

Preferred embodiments in the previous description of modulation and demodulation algorithms and implementations for QLM for the known modulations and demodulations and for all future modulations and demodulations, are provided to enable any person skilled in the art to make or use the present invention. The various modifications to these embodiments will be readily apparent to those skilled in the art and the generic principles defined herein may be applied to other embodiments without the use of the inventive faculty. Thus, the present invention is not intended to be limited to the embodiments shown herein but is to be accorded the wider scope consistent with the principles and novel features disclosed herein. Additional applications for QLM signal processing and bound include the plurality of information theorectic applications with examples being radar, imaging, and media processing.

What is claimed is:

1. A method for implementation of a QLM communications receiver using a trellis symbol algorithm for demodulation of QLM, said method comprising the steps:
   receiving QLM data symbols indexed on k=1,2,...n for n data symbols,
   evaluating correlation coefficients for received QLM data symbols,
   establishing trellis states and trellis paths for each data symbol whereby
      a) there are $n_s\char`^(2n_c-2)$ trellis states wherein "$n_s$" is the number of states of each data symbol, and "$n_c$" is the number of one-sided correlation coefficients for symmetrical correlation functions,
      b) there are $n_s\char`^(2n_c-1)$ trellis paths from trellis state $S_{k-1}$ for data symbol k-1 to a new trellis state $S_k$ for data symbol k,
      c) index jxi=0,1,2,,,, $n_s\char`^(2n_c-1)-1$ is a trellis path index from $S_{k-1}$ to $S_k$ using $n_s$-ary index symbols jxi reading from left to right wherein "j" is an index for a new data symbol, "i" is an index for a last data symbol and "x" is a set of $n_s$-ary index data symbols between "j" and "i",
      d) index jx is over $n_s\char`^(2n_c-2)$ trellis states $S_k(jx)$,
      e) index xi is over $n_s\char`^(2n_c-2)$ trellis states $S_{k-1}(xi)$,
      f) creating a D row by $n_s\char`^(2n_c-2)$ column memory "M" for storing trellis path decisions wherein D is a multiple of $n_c$,
   initializing the trellis algorithm for k=0,
   implementing the trellis algorithm for each step k starting with k=1 by
      1) evaluating hypothesized values $\hat{X}_k(jxi)$ of received QLM correlated data symbols for all paths jxi,
      2) measuring a received QLM data symbol $Y_k$ for data symbol k,
      3) evaluating a logarithm state transition decisioning metric R(jxi) which is a function of $\hat{X}_k(jxi)$ and $Y_k$ for symbol k for all possible paths jxi from $S_{k-1}(xi)$ to $S_k(jx)$
      4) finding a best path metric $\alpha_k(jx)$ and corresponding path jxi from $S_{k-1}(xi)$ to $S_k(jx)$ by using a logarithm decisioning equation $\alpha_k(jx)=\max\{\alpha_{k-1}(xi)+R_k(jxi)\}$ which finds xi that maximizes "max" the sum "$\alpha_{k-1}(xi)+R_k(jxi)$" for a given jx,
      5) using said $\alpha_k(jx)$ and corresponding jxi to define a data symbol estimate $\hat{Z}_k$ for $S_k(jx)$,
      6) for k<D continuing to fill memory M from the top down by replacing column xi with column jx after moving the row elements of column xi down by one symbol and placing $\hat{Z}_k$ in the vacant first row, for all jx,
      7) for k≧D continuing to replenish memory M from the top down by replacing column xi with column jx after moving the row elements of column xi down by one symbol and placing $\hat{Z}_k$ in the vacant first row, for all jx,
      8) for k≧D selecting the last symbol $\hat{Z}_{k-D}$ in column jx in the deleted bottom row corresponding to the maximium value of $\alpha_k(jx)$ over all jx, as the best estimate of data symbol k-D,
      9) for k>n continuing step 8 without replenishing memory M to complete the estimates of the n data symbols,
      10) performing error correction decoding of these estimated data symbols, and
   handing over said demodulated and decoded data symbol information to the receiver for further processing.

2. A method of claim 1 for implementation of a QLM communications receiver using a trellis bit algorithm for demodulation of QLM, said method comprising the steps:
   using a trellis symbol algorithm in claim 1 to implement a trellis bit algorithm by
      1) implementing said trellis symbol algorithm with data symbols reduced to a first bit $b_0$ for each of the received correlated data symbols in a first pass,
      2) implementing error correction decoding and re-encoding of the estimated first bits from step 1 to correct the decisioning errors if necessary, in the first pass,
      3) repeating step 1 using two-bit data symbol words $b_0 b_1$ in a second pass wherein bit $b_0$ is the estimate from the first pass and the second bit $b_1$ is estimated by the trellis algorithm,
      4) for additional bits in the data symbol words, repeat error correction decoding and re-encoding in step 2 for the second pass and implement step 3 in a third pass to estimate $b_0 b_1 b_2$ using the previous estimates of $b_0 b_1$ from the second pass,
      5) repeating step 3 for each additional bit in the data symbol words,
      6) continuing with these passes until the final bit pass to estimate the data symbols,
      7) performing error correction decoding of these estimated data symbols, and
   handing over said demodulated and decoded data symbol information to the receiver for further processing.

3. A method for implementation of a QLM communications receiver using one or more methods for reducing computational complexity for demodulation of QLM, said methods comprising:
   reducing the number of trellis states jx and transition paths jxi in the trellis algorithm by eliminating trellis states and trellis paths which have relatively poor values of the path metric $\alpha_k(jx)$ used to select a new data symbol estimate, reducing the number of trellis states by deleting lower correlation values of the sidelobes and mainlobe, modifying an iterative trellis algorithm to calculate the forward trellis performance using the forward half of the mainlobe and followed by a backward trellis algorithm using the other half of the mainlobe, modifying said iterative trellis algorithm to incorporate said techniques to eliminate trellis state and trellis paths with relatively poor performance metrics, and using sequential demodulation techniques, partial symbol and bit integration over $\Delta T_s$ intervals and $\Delta k$ intervals, and other demodulation techniques as potential candidates for QLM demodulation, and handing over said demodulated data symbol information to the receiver for decoding and further processing.

4. A method of claim 1 for implementation of a QLM communications receiver using error correction decoding in parallel with QLM trellis demodulation of a received QLM signal, said method comprising:

encoding transmitted data in a transmitter with an error correction code prior to mapping of said encoded data onto transmitted QLM data symbols, using said error correction code generator in a receiver to map hypothesized received data values onto hypothesized values $\hat{X}_k(jxi)$ of received QLM correlated data symbols for all paths jxi allowed by the method as recited in claim 1, measuring a received QLM data symbol for each index k, evaluating a logarithm state transition decisioning metric $R(jxi)$ which is a function of $\hat{X}_k(jxi)$ and received QLM data symbol at index k for all possible paths jxi allowed by the method as recited in claim 1, finding the best estimate $dd_k$ of the uncoded b bit data word corresponding to the $b_s$ bit data symbol $\hat{Z}_k$ for index k which provides the best path metric $\alpha_k(jx)$ recited in claim 1, storing $dd_k$ in place of $\hat{Z}_k$ in remaining calculations to find the best path and the corresponding best $dd_k$ for each index k as recited in claim 1, and transferring the digital stream of b bit $dd_k$ uncoded data words to said receiver for further processing.

5. A method for implementation of a QLM communications receiver using error recording decisioning metrics in a QLM trellis demodulation algorithm for soft decisioning error correction decoding of the QLM demodulated data, said method comprising:

recording decisioning metric measurements $m_k(ki)$ for all values $ki=0,1,\ldots,2^{\wedge}b_s-1$ of each data symbol at step k generated by the metric equation in logarithm form for each path jx $$m_k(ki)=\alpha_{k-1}(xi)+R_k(jxi)$$

wherein $\alpha_{k-1}(xi)$ is the previous path metric at step k−1 for the previous path index xi, $R_k(jxi)$ is the state transition decisioning metric at step k for index jxi over all possible paths for state $S_{k-1}(xi)$ transitioning to state $S_k(jx)$ where jx are the paths for step k, recording metric measurements $m_k(ki)$ in an array $m_k$, finding the QLM symbol estimate $\hat{Z}_k$ corresponding to the value of ki yielding the maximum metric in the array $m_k$, updating state metric $S_k$ for each jx value using $\hat{Z}_k$ and the corresponding $m_k$ to generate a matrix $S_k$ with dual entries $\hat{Z}_k$ and $m_k$, continuing this processing to generate the array of data symbol estimates $\hat{Z}_k$ and corresponding measurement metrics $m_k$ for all of the estimated QLM data symbols, and transferring the outputs as a digital stream of $b_s$ bit data words for each demodulated data symbols $\hat{Z}_k$ and a corresponding digital stream of $b_s$ bit metric measurements for each data word, to a receiver for further processing.

6. The method of claim 5 for implementation of a QLM communications receiver using hard and soft decisioning error correction decoding of QLM trellis demodulation, said method comprising:

generating data bits and decisioning metrics as recited in claim 5, using these decisioning metrics for soft decisioning decoding Including MAP decoding, convolutional decoding, turbo decoding, and for block decoding, using these decisioning metrics to replace the decisioning measurements normally available in the received data, for applications of soft decisioning decoding algorithms, and using data bits generated in a QLM demodulator for hard decisioning decoding.

* * * * *